US008325097B2

(12) United States Patent
McKinzie, III et al.

(10) Patent No.: US 8,325,097 B2
(45) Date of Patent: Dec. 4, 2012

(54) ADAPTIVELY TUNABLE ANTENNAS AND METHOD OF OPERATION THEREFORE

(75) Inventors: William E. McKinzie, III, Fulton, MD (US); Keith Manssen, Bull Valley, IL (US); Greg Mendolia, Nashua, NH (US)

(73) Assignee: Research In Motion RF, Inc., Wilmington, DE (US)

( * ) Notice: Subject to any disclaimer, the term of this patent is extended or adjusted under 35 U.S.C. 154(b) by 1554 days.

(21) Appl. No.: 11/653,643

(22) Filed: Jan. 16, 2007

(65) Prior Publication Data

US 2007/0200766 A1 Aug. 30, 2007

Related U.S. Application Data

(60) Provisional application No. 60/758,865, filed on Jan. 14, 2006.

(51) Int. Cl.
*H01Q 1/50* (2006.01)
*H04B 1/04* (2006.01)

(52) U.S. Cl. ...................... 343/703; 343/861; 455/114.1

(58) Field of Classification Search ........... 343/700 MS, 343/702, 745, 750, 850, 852, 860, 861, 703; 333/17.3; 455/574, 67.13, 114.1, 115.1, 455/127.1, 129, 575.7
See application file for complete search history.

(56) References Cited

U.S. PATENT DOCUMENTS

| | | | |
|---|---|---|---|
| 2,745,067 | A | 5/1956 | True |
| 3,160,832 | A | 12/1961 | Beitman |
| 3,117,279 | A | 6/1962 | Ludvigson |
| 3,390,337 | A | 3/1966 | Beitman |
| 3,443,231 | A | 4/1966 | Roza |
| 3,509,500 | A | 4/1970 | McNair |
| 3,571,716 | A | 3/1971 | Hill |
| 3,590,385 | A | 6/1971 | Sabo |
| 3,601,717 | A | 8/1971 | Kuecken |
| 3,794,941 | A | 2/1974 | Templin |
| 3,919,644 | A | 11/1975 | Smolka |
| 3,990,024 | A | 11/1976 | Hou |
| 3,995,237 | A | 11/1976 | Brunner |
| 4,186,359 | A | 1/1980 | Kaegebein |
| 4,201,960 | A | 5/1980 | Skutta |

(Continued)

FOREIGN PATENT DOCUMENTS

DE 19614655 10/1997

(Continued)

OTHER PUBLICATIONS

Hyun, S. , "Effects of strain on the dielectric properties of tunable dielectric SrTi03 thin films", Applied Physics Letters, 2004 American Institute of Physics.

(Continued)

*Primary Examiner* — Michael C Wimer
(74) *Attorney, Agent, or Firm* — Guntin Meles & Gust, PLC; Andrew Gust

(57) ABSTRACT

An embodiment of the present invention is an apparatus, comprising a tunable antenna including a variable reactance network connected to the antenna a closed loop control system adapted to sense the RF voltage across the variable reactance network and adjust the reactance of the network to maximize the RF voltage. The variable reactance network may comprise a parallel capacitance or a series capacitance. Further, the variable reactance networks may be connected to the antenna, which may be a patch antenna, a monopole antenna, or a slot antenna.

17 Claims, 24 Drawing Sheets

U.S. PATENT DOCUMENTS

| | | | | | |
|---|---|---|---|---|---|
| 4,227,256 | A | | 10/1980 | O'Keefe | |
| 4,383,441 | A | | 5/1983 | Willis | |
| 4,493,112 | A | * | 1/1985 | Bruene | 455/123 |
| 4,777,490 | A | * | 10/1988 | Sharma et al. | 343/754 |
| 4,799,066 | A | | 1/1989 | Deacon | |
| 4,965,607 | A | | 10/1990 | Wilkins | |
| 5,032,805 | A | | 7/1991 | Elmer | |
| 5,142,255 | A | | 8/1992 | Chang | |
| 5,177,670 | A | | 1/1993 | Shinohara | |
| 5,195,045 | A | | 3/1993 | Keane | |
| 5,200,826 | A | | 4/1993 | Seong | |
| 5,212,463 | A | | 5/1993 | Babbitt | |
| 5,243,358 | A | | 9/1993 | Sanford | |
| 5,258,728 | A | | 11/1993 | Taniyoshi | |
| 5,301,358 | A | | 4/1994 | Gaskill | |
| 5,307,033 | A | | 4/1994 | Koscica | |
| 5,310,358 | A | | 5/1994 | Johnson | |
| 5,312,790 | A | | 5/1994 | Sengupta | |
| 5,334,958 | A | | 8/1994 | Babbitt | |
| 5,371,473 | A | | 12/1994 | Trinh | |
| 5,409,889 | A | | 4/1995 | Das | |
| 5,427,988 | A | | 6/1995 | Sengupta | |
| 5,430,417 | A | | 7/1995 | Martin | |
| 5,446,447 | A | | 8/1995 | Carney | |
| 5,448,252 | A | | 9/1995 | Ali | |
| 5,451,567 | A | | 9/1995 | Das | |
| 5,451,914 | A | | 9/1995 | Stengel | |
| 5,457,394 | A | | 10/1995 | McEwan | |
| 5,472,935 | A | | 12/1995 | Yandrofski | |
| 5,479,139 | A | | 12/1995 | Koscica | |
| 5,486,491 | A | | 1/1996 | Sengupta | |
| 5,496,795 | A | | 3/1996 | Das | |
| 5,502,372 | A | | 3/1996 | Quan | |
| 5,524,281 | A | | 6/1996 | Bradley | |
| 5,561,407 | A | | 10/1996 | Koscica | |
| 5,564,086 | A | | 10/1996 | Cygan | |
| 5,593,495 | A | | 1/1997 | Masuda | |
| 5,635,433 | A | | 6/1997 | Sengupta | |
| 5,635,434 | A | | 6/1997 | Sengupta | |
| 5,640,042 | A | | 6/1997 | Koscica | |
| 5,679,624 | A | | 10/1997 | Das | |
| 5,689,219 | A | | 11/1997 | Piirainen | |
| 5,693,429 | A | | 12/1997 | Sengupta | |
| 5,694,134 | A | | 12/1997 | Barnes | |
| 5,699,071 | A | | 12/1997 | Urakami | |
| 5,766,697 | A | | 6/1998 | Sengupta | |
| 5,778,308 | A | | 7/1998 | Sroka | |
| 5,786,727 | A | | 7/1998 | Sigmon | |
| 5,812,943 | A | | 9/1998 | Suzuki | |
| 5,830,591 | A | | 11/1998 | Sengupta | |
| 5,846,893 | A | | 12/1998 | Sengupta | |
| 5,874,926 | A | | 2/1999 | Tsuru | |
| 5,880,635 | A | | 3/1999 | Satoh | |
| 5,886,867 | A | | 3/1999 | Chivukula | |
| 5,929,717 | A | * | 7/1999 | Richardson et al. | 333/17.3 |
| 5,963,871 | A | | 10/1999 | Zhinong | |
| 5,969,582 | A | | 10/1999 | Boesch | |
| 5,990,766 | A | | 11/1999 | Zhang | |
| 6,009,124 | A | | 12/1999 | Smith | |
| 6,020,787 | A | | 2/2000 | Kim | |
| 6,029,075 | A | | 2/2000 | Das | |
| 6,045,932 | A | | 4/2000 | Jia | |
| 6,061,025 | A | | 5/2000 | Jackson | |
| 6,074,971 | A | | 6/2000 | Chiu | |
| 6,096,127 | A | | 8/2000 | Dimos | |
| 6,100,733 | A | | 8/2000 | Dortu | |
| 6,101,102 | A | | 8/2000 | Brand | |
| 6,133,883 | A | | 10/2000 | Munson | |
| 6,172,385 | B1 | | 1/2001 | Duncombe | |
| 6,215,644 | B1 | | 4/2001 | Dhuler | |
| 6,281,847 | B1 | | 8/2001 | Lee | |
| 6,343,208 | B1 | | 1/2002 | Ying | |
| 6,377,142 | B1 | | 4/2002 | Chiu | |
| 6,377,217 | B1 | | 4/2002 | Zhu | |
| 6,377,440 | B1 | | 4/2002 | Zhu | |
| 6,384,785 | B1 | | 5/2002 | Kamogawa | |
| 6,404,614 | B1 | | 6/2002 | Zhu | |
| 6,408,190 | B1 | | 6/2002 | Ying | |
| 6,414,562 | B1 | | 7/2002 | Bouisse | |
| 6,415,562 | B1 | | 7/2002 | Donaghue | |
| 6,452,776 | B1 | | 9/2002 | Chakravorty | |
| 6,461,930 | B2 | | 10/2002 | Akram | |
| 6,466,774 | B1 | | 10/2002 | Okabe | |
| 6,492,883 | B2 | | 12/2002 | Liang | |
| 6,514,895 | B1 | | 2/2003 | Chiu | |
| 6,525,630 | B1 | | 2/2003 | Zhu | |
| 6,531,936 | B1 | | 3/2003 | Chiu | |
| 6,535,076 | B2 | | 3/2003 | Partridge | |
| 6,535,722 | B1 | | 3/2003 | Rosen | |
| 6,538,603 | B1 | | 3/2003 | Chen | |
| 6,556,102 | B1 | | 4/2003 | Sengupta | |
| 6,556,814 | B1 | | 4/2003 | Klomsdorf | |
| 6,570,462 | B2 | | 5/2003 | Edmonson | |
| 6,590,468 | B2 | | 7/2003 | du Toit et al. | |
| 6,590,541 | B1 | | 7/2003 | Schultze | |
| 6,597,265 | B2 | | 7/2003 | Liang | |
| 6,608,603 | B2 | | 8/2003 | Alexopoulos | |
| 6,624,786 | B2 | | 9/2003 | Boyle | |
| 6,657,595 | B1 | | 12/2003 | Phillips | |
| 6,661,638 | B2 | | 12/2003 | Jackson | |
| 6,670,256 | B2 | | 12/2003 | Yang | |
| 6,710,651 | B2 | | 3/2004 | Forrester | |
| 6,724,611 | B1 | | 4/2004 | Mosley | |
| 6,724,890 | B1 | | 4/2004 | Bareis | |
| 6,737,179 | B2 | | 5/2004 | Sengupta | |
| 6,759,918 | B2 | | 7/2004 | Du Toit | |
| 6,765,540 | B2 | | 7/2004 | Toncich | |
| 6,768,472 | B2 | | 7/2004 | Alexopoulos | |
| 6,774,077 | B2 | | 8/2004 | Sengupta | |
| 6,795,712 | B1 | | 9/2004 | Vakilian | |
| 6,825,818 | B2 | | 11/2004 | Toncich | |
| 6,839,028 | B2 | | 1/2005 | Lee | |
| 6,845,126 | B2 | | 1/2005 | Dent | |
| 6,859,104 | B2 | | 2/2005 | Toncich | |
| 6,862,432 | B1 | | 3/2005 | Kim | |
| 6,864,757 | B2 | | 3/2005 | Du Toit | |
| 6,868,260 | B2 | | 3/2005 | Jagielski | |
| 6,888,714 | B2 | | 5/2005 | Shaw | |
| 6,905,989 | B2 | | 6/2005 | Ellis | |
| 6,907,234 | B2 | | 6/2005 | Karr | |
| 6,920,315 | B1 | | 7/2005 | Wilcox | |
| 6,943,078 | B1 | | 9/2005 | Zheng | |
| 6,946,847 | B2 | | 9/2005 | Nishimori | |
| 6,949,442 | B2 | | 9/2005 | Barth | |
| 6,961,368 | B2 | | 11/2005 | Dent | |
| 6,964,296 | B2 | | 11/2005 | Memory | |
| 6,965,837 | B2 | | 11/2005 | Vintola | |
| 6,993,297 | B2 | | 1/2006 | Smith | |
| 7,009,455 | B2 | | 3/2006 | Toncich | |
| 7,071,776 | B2 | | 7/2006 | Forrester | |
| 7,107,033 | B2 | | 9/2006 | du Toit | |
| 7,113,614 | B2 | | 9/2006 | Rhoads | |
| 7,151,411 | B2 | | 12/2006 | Martin | |
| 7,176,634 | B2 | | 2/2007 | Kitamura | |
| 7,176,845 | B2 | | 2/2007 | Fabrega-Sanchez | |
| 7,180,467 | B2 | | 2/2007 | Fabrega-Sanchez | |
| 7,221,327 | B2 | | 5/2007 | Toncich | |
| 7,312,118 | B2 | | 12/2007 | Kiyotoshi | |
| 7,332,980 | B2 | | 2/2008 | Zhu | |
| 7,332,981 | B2 | | 2/2008 | Matsuno | |
| 7,339,527 | B2 | | 3/2008 | Sager | |
| 7,426,373 | B2 | | 9/2008 | Clingman | |
| 7,468,638 | B1 | | 12/2008 | Tsai | |
| 7,535,312 | B2 | | 5/2009 | McKinzie | |
| 7,539,527 | B2 | | 5/2009 | Jang | |
| 7,596,357 | B2 | | 9/2009 | Nakamata | |
| 7,667,663 | B2 | | 2/2010 | Hsiao | |
| 7,711,337 | B2 | | 5/2010 | McKinzie | |
| 7,714,678 | B2 | | 5/2010 | du Toit | |
| 7,728,693 | B2 | | 6/2010 | du Toit | |
| 7,795,990 | B2 | | 9/2010 | du Toit | |
| 7,852,170 | B2 | | 12/2010 | McKinzie | |
| 7,865,154 | B2 | | 1/2011 | Mendolia | |
| 7,969,257 | B2 | | 6/2011 | du Toit | |
| 2002/0191703 | A1 | | 12/2002 | Ling | |
| 2002/0193088 | A1 | | 12/2002 | Jung | |
| 2003/0060227 | A1 | | 3/2003 | Sekine | |

| | | | |
|---|---|---|---|
| 2003/0071300 | A1 | 4/2003 | Yashima |
| 2003/0114124 | A1 | 6/2003 | Higuchi |
| 2003/0193997 | A1 | 10/2003 | Dent |
| 2003/0232607 | A1 | 12/2003 | Le Bars |
| 2004/0009754 | A1 | 1/2004 | Smith, Jr. |
| 2004/0137950 | A1 | 7/2004 | Bolin |
| 2004/0202399 | A1 | 10/2004 | Kochergin |
| 2004/0257293 | A1 | 12/2004 | Friedrich |
| 2005/0032488 | A1 | 2/2005 | Pehlke |
| 2005/0042994 | A1 | 2/2005 | Otaka |
| 2005/0059362 | A1 | 3/2005 | Kalajo |
| 2005/0082636 | A1 | 4/2005 | Yashima |
| 2005/0093624 | A1 | 5/2005 | Forrester |
| 2005/0130608 | A1 | 6/2005 | Forse |
| 2005/0215204 | A1 | 9/2005 | Wallace |
| 2005/0282503 | A1 | 12/2005 | Onno |
| 2006/0003537 | A1 | 1/2006 | Sinha |
| 2006/0009165 | A1 | 1/2006 | Alles |
| 2006/0160501 | A1 | 7/2006 | Mendolia |
| 2006/0183433 | A1 | 8/2006 | Mori |
| 2006/0183442 | A1 | 8/2006 | Chang |
| 2006/0281423 | A1 | 12/2006 | Caimi |
| 2007/0013483 | A1 | 1/2007 | Stewart |
| 2007/0042725 | A1 | 2/2007 | Poilasne |
| 2007/0042734 | A1 | 2/2007 | Ryu |
| 2007/0080888 | A1 | 4/2007 | Mohamadi |
| 2007/0082611 | A1 | 4/2007 | Terranova et al. |
| 2007/0085609 | A1 | 4/2007 | Itkin |
| 2007/0142014 | A1 | 6/2007 | Wilcox |
| 2007/0149146 | A1 | 6/2007 | Hwang |
| 2007/0194859 | A1 | 8/2007 | Brobston |
| 2007/0197180 | A1 | 8/2007 | McKinzie |
| 2007/0200766 | A1 | 8/2007 | McKinzie |
| 2007/0285326 | A1 | 12/2007 | McKinzie |
| 2008/0055016 | A1 | 3/2008 | Morris |
| 2008/0122553 | A1 | 5/2008 | McKinzie |
| 2008/0122723 | A1 | 5/2008 | Rofougaran |
| 2008/0158076 | A1 | 7/2008 | Walley |
| 2008/0274706 | A1 | 11/2008 | Blin |
| 2009/0109880 | A1 | 4/2009 | Kim |
| 2009/0149136 | A1 | 6/2009 | Rofougaran |
| 2010/0085260 | A1 | 4/2010 | McKinzie |
| 2010/0156552 | A1 | 6/2010 | McKinzie |

FOREIGN PATENT DOCUMENTS

| | | |
|---|---|---|
| EP | 0685936 | 6/1995 |
| EP | 0909024 | 9/1998 |
| EP | 0909024 | 4/1999 |
| EP | 1137192 | 9/2001 |
| EP | 1298810 | 4/2006 |
| JP | 03276901 | 3/1990 |
| JP | 10209722 | 8/1998 |
| WO | WO-2009/064968 | 5/2009 |
| WO | WO-2011/044592 | 4/2011 |
| WO | WO-2011/028453 | 10/2011 |
| WO | WO-2011/133657 | 10/2011 |

OTHER PUBLICATIONS

Ida, I. et al., "An Adaptive Impedence Matching System and Its Application to Mobile Antennas", TENCON 2004, IEEE Region 10 Conference, See Abstract ad p. 544, Nov. 21-24, 2004, 543-547.

Patent Cooperation Treaty, , "International Search Report and Written Opinion", International Applicaton No. PCT/US2010/046241, Mar. 2, 2011.

Patent Cooperation Treaty, , "International Search Report and Written Opinion", PCT Application No. PCT/US08/005085, Jul. 2, 2008.

Pervez, N.K. , "High Tunability barium strontium titanate thin films for RF circuit applications", Applied Physics Letters, 2004 American Institute of Physics.

Qiao, et al., "Antenna Impedance Mismatch Measurement and Correction for Adaptive COMA Transceivers", IEEE, 2005.

Qiao, et al., "Measurement of Antenna Load Impedance for power Amplifiers", The Department of Electrical and Computer Engineering, University of California, San Diego, Sep. 13, 2004.

Stemmer, Susanne , "Low-loss tunable capacitors fabricated directly on gold bottom electrodes", University of California Postprints 2006.

Taylor, T.R. , "Impact of thermal strain on the dielectric constant of sputtered barium strontium titanate thin films", Applied Physics Letters, 2002 American Institute of Physics.

Tombak, Ali , Tunable Barium Strontium Titanate Thin Film Capacitors for RF and Microwave Applications. IEEE Microwave and Wireles Components Letters, vol. 12, Jan. 2002.

Xu, Hongtao , "Tunable Microwave Integrated Circuits using BST Thin Film Capacitors with Device", Integrated Ferroelectrics, Department of Electrical Engineering and Computer Engineering, University of California, 2005.

Du Toit, , "Tunable Microwave Devices With Auto Adjusting Matching Circuit", U.S. Appl. No. 13/302,617, filed Nov. 22, 2011.

Du Toit, , "Tunable Microwave Devices With Auto-Adjusting Matching Circuit", U.S. Appl. No. 13/302,649, filed Nov. 22, 2011.

Greene, , "Method and Apparatus for Tuning a Communication Device", U.S. Appl. No. 13/108,463, filed May 16, 2011.

Greene, , "Method and Apparatus for Tuning a Communication Device", U.S. Appl. No. 13/108,589, filed May 16, 2011.

Hoirup, , "Method and Apparatus for Radio Antenna Frequency Tuning", U.S. Appl. No. 13/030,177, filed Feb. 18, 2011.

Manssen, , "Method and Apparatus for Managing Interference in a Communication Device", U.S. Appl. No. 61/326,206, filed Apr. 20, 2010.

Manssen, , "Method and Apparatus for Tuning Antennas in a Communication Device", U.S. Appl. No. 12/941,972, filed Nov. 8, 2010.

Manssen, , "Method and Apparatus for Tuning Antennas in a Communication Device", U.S. Appl. No. 13/005,122, filed Jan. 12, 2011.

McKinzie, , "Adaptive Impedance Matching Module (AIMM) Control Architectures", U.S. Appl. No. 13/293,544, filed Nov. 10, 2011.

McKinzie, , "Adaptive Impedance Matching Module (AIMM) Control Architectures", U.S. Appl. No. 13/293,550, filed Nov. 10, 2011.

McKinzie, , "Method and Apparatus for Adaptive Impedance Matching", U.S. Appl. No. 13/217,748, filed Aug. 25, 2011.

Mendolia, , "Method and Apparatus for Tuning a Communication Device", U.S. Appl. No. 13/035,417, filed Feb. 25, 2011.

Paratek Microwave, Inc., , "Method and Apparatus for Tuning Antennas in a Communication Device", International Application No. PCT/US11/59620; Filed Nov. 7, 2011.

Spears, , "Methods for Tuning an Adaptive Impedance Matching Network With a Look-Up Table", U.S. Appl. No. 13/297,951, filed Nov. 16, 2011.

Patent Cooperation Treaty, "International Search Report and Written Opinion", International Application No. PCT/US2010/056413, Jul. 27, 2011.

* cited by examiner

600

1900

2000

ADAPTIVELY TUNABLE ANTENNAS AND METHOD OF OPERATION THEREFORE

CROSS REFERENCE TO RELATED APPLICATIONS

This application claims the benefit of Provisional Patent Application Ser. No. 60/758,865, filed Jan. 14, 2006 entitled "Adaptive Tunable Antenna Control Techniques", by William E. McKinzie.

BACKGROUND

Mobile communications has become vital throughout society. Not only is voice communications prevalent, but also the need for mobile data communications is enormous. Further, antenna efficiency is vital to mobile communications as well as antenna efficiency of an electrically small antenna that may undergo changes in its environment. Tunable antennas are important as components of wireless communications and may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), ZigBee (TM), or the like. Embodiments of the invention may be used in various other apparatuses, devices, systems and/or networks.

Thus, it is very important to improve the antenna efficiency of an electrically small antenna that undergoes changes in its environment.

SUMMARY OF THE INVENTION

An embodiment of the present invention provides an apparatus, comprising a tunable antenna including a variable reactance network connected to the antenna a closed loop control system adapted to sense the RF voltage across the variable reactance network and adjust the reactance of the network to maximize the RF voltage. The variable reactance network may comprise a parallel capacitance or a series capacitance. Further, the variable reactance networks may be connected to the antenna, which may be a patch antenna, a monopole antenna, or a slot antenna. In an embodiment of the present invention the control loop control system may use an algorithm implemented on a digital processor to maximize the RF voltage and may use the digital processor in a baseband processor in a mobile phone.

In yet another embodiment of the present invention, the apparatus may further comprise a directional coupler used at the input port of the tunable antenna to monitor input return loss and a dual input voltage detector, or a single voltage detector plus an RF switch, to monitor forward and reverse power levels allowing the return loss to be calculated by a controller.

Still another embodiment of the present invention provides a method, comprising improving the efficiency of an antenna system by sensing the RF voltage present on a variable reactance network within the antenna system, controlling the bias signal presented to the variable reactance network, and maximizing the RF voltage present on the variable reactance network.

Yet another embodiment of the present invention provides an adaptively tuned antenna, comprising a variable reactance network connected to the antenna, an RF detector to sense the voltage on the antenna, a controller that monitors the RF voltage and supplies control signals to a driver circuit, and wherein the driver circuit converts the control signals to bias signals for the variable reactance network.

Still another embodiment of the present invention provides a machine-accessible medium that provides instructions, which when accessed, cause a machine to perform operations comprising improving the efficiency of an antenna system by sensing the RF voltage present on a variable reactance network within the antenna system, controlling the bias signal presented to the variable reactance network and maximizing the RF voltage present on the variable reactance network.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
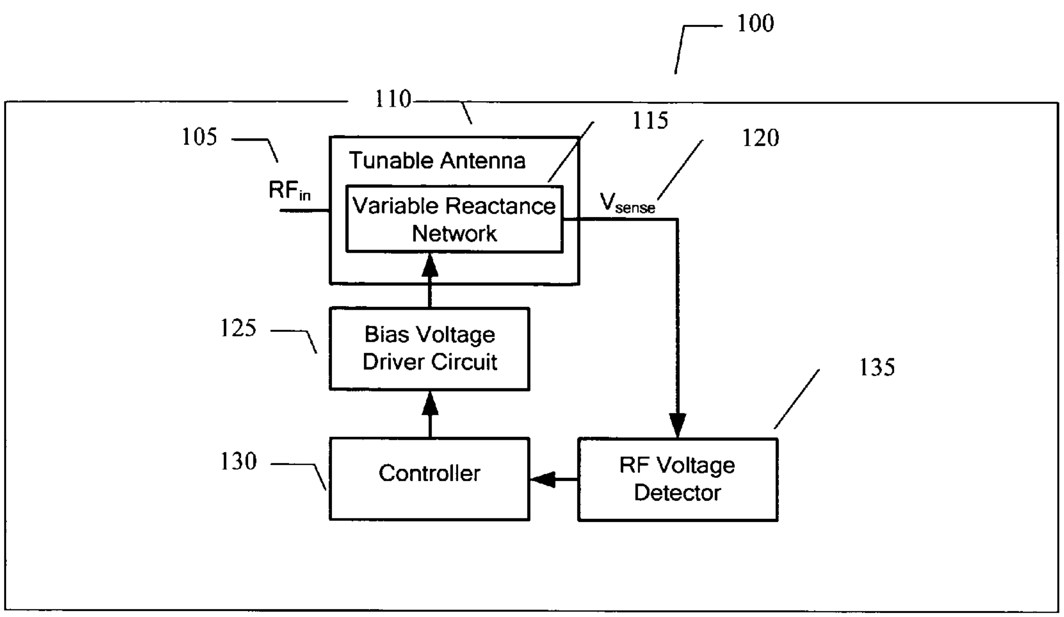
FIG. 1 illustrates a block diagram of the first embodiment of an adaptively tuned antenna of one embodiment of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, and/or that the two or more elements co-operate or interact with each other (e.g. as in a cause an effect relationship).

An embodiment of the present invention provides an improvement for the antenna efficiency of an electrically small antenna that undergoes changes in its environment by automatically adjusting the reactance of at least one embedded reactive network within the antenna. A first embodiment of the present invention provides that the parameter being optimized may be the RF voltage magnitude as measured across the embedded reactive tuning network. Alternatively, the sensed RF voltage may be at another node within the electrically small antenna other than a node connected directly to an embedded reactive network. A closed loop control system may monitor the RF voltage magnitude and automatically adjust the bias on the variable reactance network to maximize the sensed RF voltage. In yet another embodiment of the present invention, the input return loss may be monitored using a conventional directional coupler and this return loss is minimized. Alternatively, in a third embodiment, RF voltage may be sensed from a miniature probe (short monopole or small area loop) placed in close proximity to the antenna, and the probe voltage maximized to optimize the radiation efficiency.

As previously stated, the function of an embodiment of the present invention may be to adaptively maximize the antenna efficiency of an electrically-small antenna when the environment of the antenna system changes as a function of time. Antenna efficiency is the product of the mismatch loss at the antenna input terminals times the radiation efficiency (radiated power over absorbed power at the antenna input port). As a consequence of optimizing the antenna efficiency, the input return loss at the antenna port is also improved.

The benefits of adaptive tuning extend beyond an improvement in antenna system efficiency. An improvement in the antenna port return loss is equivalent to an improvement in the output VSWR, or load impedance, presented to the power amplifier in a transmitting system. It has been established with RF measurements that the harmonic distortion created in a power amplifier is exacerbated by a higher load VSWR. Power amplifiers are often optimized to drive a predefined load impedance such as 50 ohms. So by adaptively tuning the antenna in a transmitting system, the harmonic distortion or radiated harmonics may be adaptively improved.

In addition, the power added efficiency (PAE) of the power amplifier is also a function of its output VSWR. Often a power amplifier is optimized for power efficiency using predefined load impedance that corresponds to a minimum VSWR. Since the DC power consumption $P_{DC}$ of a power amplifier is $$P_{DC} = \frac{P_{out} - P_{in}}{PAE},$$

where $P_{in}$ is the input power and $P_{out}$ is the output power, we note that increasing (improving) the PAE will reduce the DC power consumption. Hence it becomes apparent that an adaptively tuned antenna may also adaptively minimize the DC power consumption in a transmitter or transceiver by controlling the power amplifier load impedance.

Turning now to FIG. 1, generally at 100, is a block diagram of the first embodiment of the present invention comprising of a tunable antenna 110 connected to $RF_{in}$ 105 and containing a variable reactance network 115. The value of the reactance is controlled by a bias voltage or bias current via controller 130 that is provided by a driver circuit 125. An RF voltage, $V_{sense}$ 120, at a location inside the antenna and located on or near the variable reactance is sensed by an RF voltage detector 135. The magnitude of $V_{sense}$ 120 is evaluated by a controller and used to adjust the bias voltage driver circuit 125. It is the function of this closed loop control system to maximize the magnitude of $V_{sense}$ 120.

The tunable antenna 110 may contain one or more variable reactive elements which may be voltage controlled. The variable reactive elements may be variable capacitances, variable inductances, or both. In general, the variable capacitors may be semiconductor varactors, MEMS varactors, MEMS switched capacitors, ferroelectric capacitors, or any other technology that implements a variable capacitance. The variable inductors may be switched inductors using various types of RF switches including MEMS-based switches. The reactive elements may be current controlled rather than voltage controlled without departing from the spirit and scope of the present invention. In one embodiment, the variable capacitors of the variable reactance network may be tunable integrated circuits known as Parascan® tunable capacitors (PTCs). Each tunable capacitor may be a realized as a series network of capacitors which may be tuned using a common bias voltage.

Figure 2:
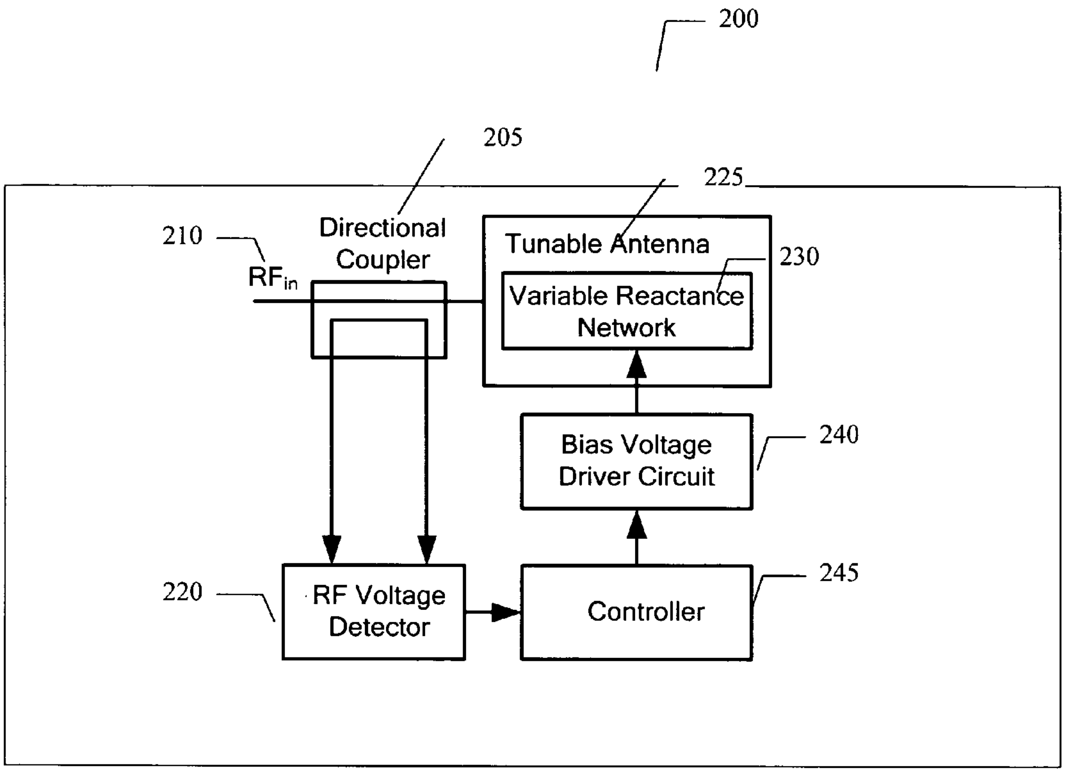
FIG. 2 illustrates a block diagram of a second embodiment of an adaptively tuned antenna of one embodiment of the present invention.

A second embodiment of this adaptively tuned antenna system is illustrated in FIG. 2, generally as 200. This is similar to the first embodiment except that a directional coupler 205 is used at the input port 210 of the tunable antenna 225 to monitor the input return loss. A dual input voltage detector 220 monitors the forward and reverse power levels allowing the return loss to be calculated by the controller 245. The controller sends signals to the driver circuit 240 which transforms the control signal into a bias voltage or current for the variable reactance elements in variable reactive network 230. The purpose of the controller is to minimize the input return loss at the RF in port. In a practical architecture there may be additional RF components located between the directional coupler and the tuanble antenna, including switches and filters. However, this will not limit the function of the invention.

Figure 3:
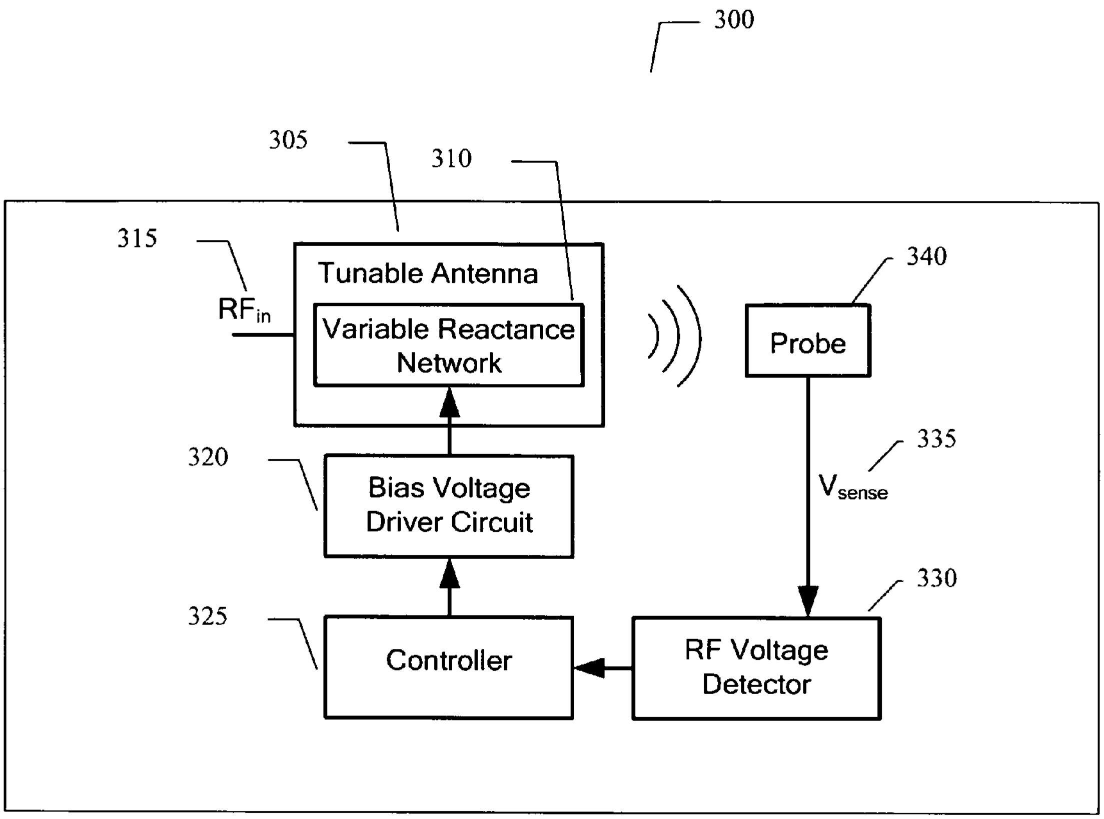
FIG. 3 illustrates a block diagram of a third embodiment of the present invention of an adaptively tuned antenna.

A third embodiment of this adaptively tuned antenna system is illustrated generally at 300 of FIG. 3. This is similar to the first embodiment except that an external probe 340 is used to monitor radiated power. The probe 340 may be a short monopole or a small area loop, although the present invention is not limited in this respect. In a typical application, it may be placed close to the antenna, or even in its near field. Its purpose is to receive RF power radiated by the tunable antenna 305 and to provide an RF voltage $V_{sense}$ 335 to the RF voltage detector 330 whose magnitude squared is proportional to the power radiated by the antenna 305. The feedback loop does involve a free-space link. However, if the probe is placed within one Wheeler radian sphere (radius=wavelength/(2π)) of the center of the antenna then the coupling may be significant and very usable. When the antenna 305 is well tuned to a desired transmitting frequency, meaning a good input return loss is achieved, then the voltage produced by the near field probe 340 will be near its maximum. Again, the output of voltage detector 330 is input to controller 325 driving bias voltage driver circuit 320 which is input to the variable reactance network 310 of tunable antenna 305. $RF_{in}$ is shown at 315.

The embodiments above are designed for transmitting antenna systems, or at least for the cases where a narrowband signal is feeding the antenna system. However, for receive mode the present invention may also employ a closed loop system to optimize the antenna efficiency. An obvious approach is to use the RSSI (receive signal strength indicator) signal output from the baseband of the radio system as a monotonic measure of received signal strength rather that the output of the RF voltage detector. However, this assumes that a signal is available to be received, and that the antenna system is adequately tuned to receive the signal, at least in some minimal sense.

Figure 4:
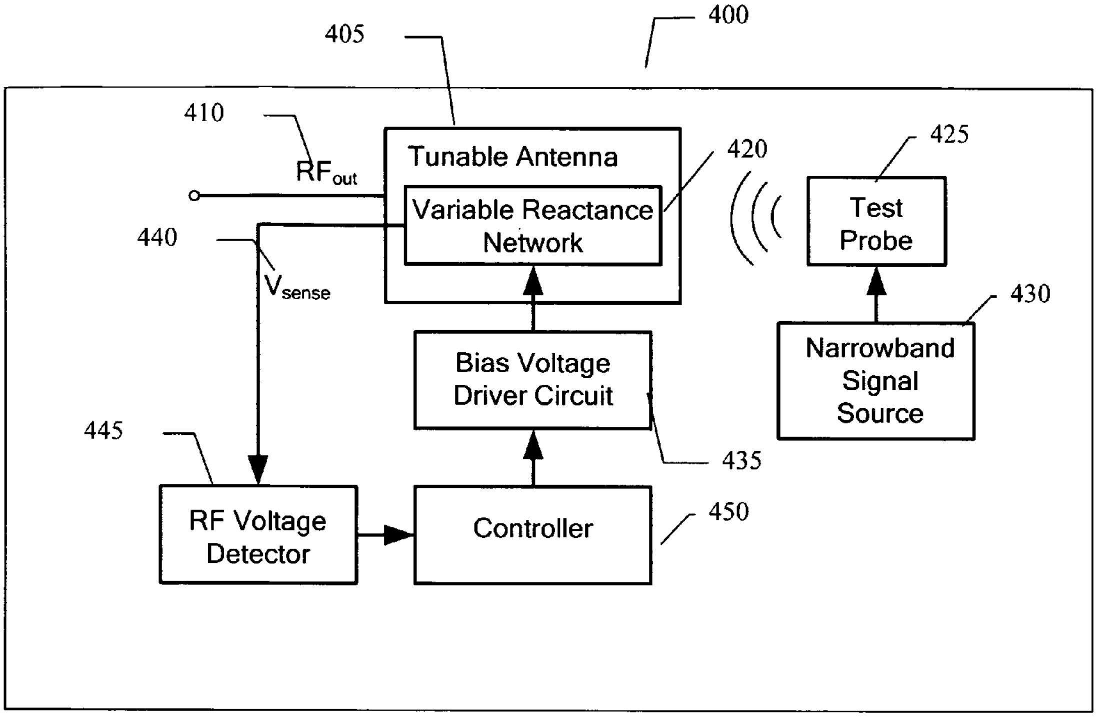
FIG. 4 illustrates a block diagram of a fourth embodiment of the present invention of an adaptively-tuned antenna system designed for receive mode operation.

To alleviate these issues, consider the adaptively tuned antenna system of FIG. 4, shown generally as 400. A more robust receive mode adaptively-tuned antenna system is one wherein the transceiver couples a small amount of narrow-band power from a test probe 425 located in close proximity to the receive mode antenna 405. For instance, the phase centers of the test probe 425 and the receive antenna 405 may be within one Wheeler radian sphere of each other. The probes 425 may be short monopoles or small area loops, or even a meandering slot. When the test probe 425 is radiating, it effectively injects a known frequency signal of constant power into the receive antenna 405. The closed loop sense and control system around the tunable reactive network is used to maximize the sensed RF voltage $V_{sense}$ 440. The narrowband signal source in FIG. 4 may be variable in frequency to cover the anticipated tuning frequency range of the tunable antenna 405.

It is anticipated that the environmental factors that dictate the need to retune the antenna of FIG. 4 will be a slowly varying random process. Furthermore, the time required to inject a known signal, for example narrow band source 430, into the test probe 425 and to allow the antenna 405 to be optimized on this test signal is expected to be a relatively rapid process. Once the antenna 405 is properly tuned, it is available for receive mode operation at that frequency. The operation of bias voltage driver circuit 435, controller 450, RF voltage detector 445, and variable reactance network 420 of tunable antenna 405 with $RF_{out}$ 410 is as described above.

It should be understood that the embodiments presented in FIGS. 1, 2, 3, and 4 are exemplary and that features of each may be combined. For instance, the adaptively tuned antenna of FIG. 4 contains all the features of FIG. 1, so it may be used for both Tx and Rx modes of operation.

In embodiments of the present invention described above, the controller block in FIGS. 1-4 may be physically located in the baseband processor in a mobile phone or PDA or other such device. However, the controller may be located on a small module near or under the antenna which may contain the PTC(s). The RF voltage detector should be located near the antenna, but the controller does not need to be and it is understood that the present invention is not limited to the placement of the controller herein described.

Furthermore, the voltage detector in FIGS. 1-4 may have the same limitations of dynamic range as described in co-pending application Ser. No. 11/594,309, entitled "Adaptive Impedance Matching Apparatus, System and Method with Improved Dynamic Range", invented by William E. McKinzie and filed Nov. 8, 2006. The solutions in this co-pending application are applicable to the present invention and this application, with the description of methods to improve dynamic range, is herein incorporated by reference.

Figure 5:
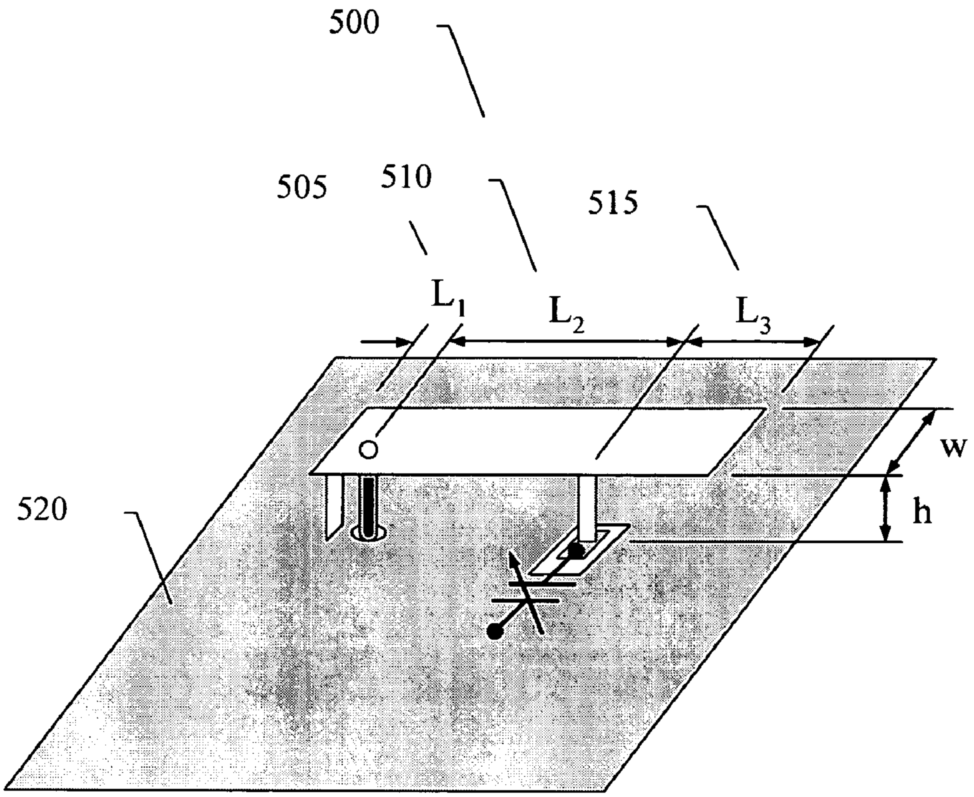
FIG. 5 illustrates an example of a tunable PIFA using a shunt variable capacitor of an embodiment of the present invention.

For further exemplification of embodiments of the present invention, a planar inverted F antenna (PIFA) 500 is shown in FIG. 5 with a shunt variable capacitor located between the probe feed point and the radiating end (open end) of the PIFA. This PIFA 500 is a type of probe-fed patch antenna located above a ground plane 520 and shorted on one end. The dimensions are selected to allow the antenna to resonate near 900 MHz: L1=1.2 mm 505, L2=34 mm 510, L3=20 mm 515, h=10 mm, and w=16 mm. In an embodiment of the present invention, there is no dielectric substrate between the patch and the ground plane, just an air gap. The antenna may be made variable in resonant frequency by using a variable capacitor that tunes over 1.0 pF to 2.0 pF placed in series with a fixed 8 pF capacitor. Together, these two capacitors may comprise the shunt variable reactance shown in FIG. 5.

Figure 6:
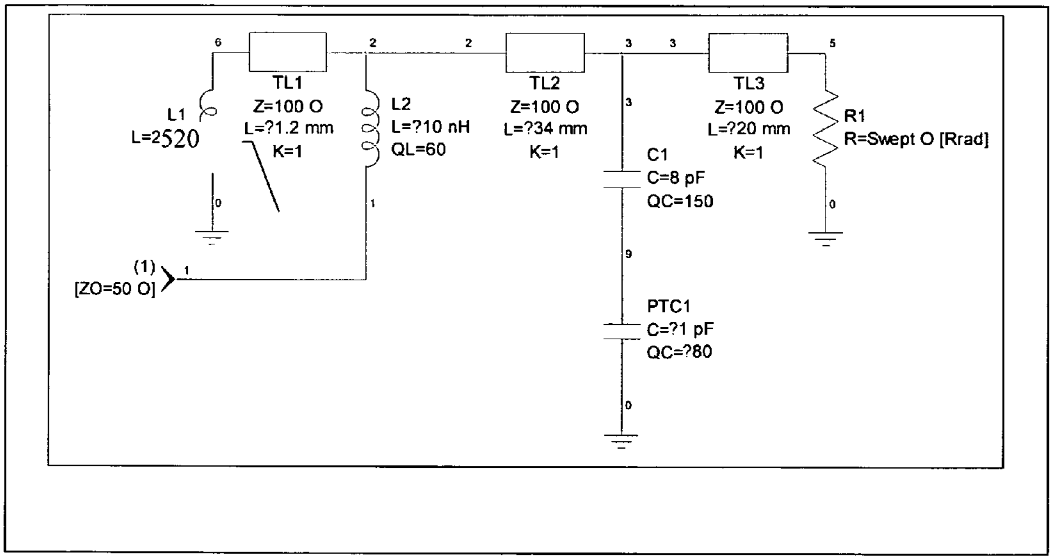
FIG. 6 depicts an equivalent circuit for the PIFA shown in FIG. 5.

An equivalent circuit for the PIFA of FIG. 5 is shown in FIG. 6 at 600. It is a transmission line (TL) model where the "lid" of the PIFA is modeled with a TL of characteristic impedance 100Ω based on the above dimensions. The short is modeled with inductor L1 and designed to have 2 nH of inductance. The feed probe 520 may be designed to have a net inductance of 10 nH which may be realized in part by a series lumped inductor. The radiation resistance R1 is modeled as 5 KΩ at 1 GHz and may vary as 1/f2 where f is frequency.

Figure 7:
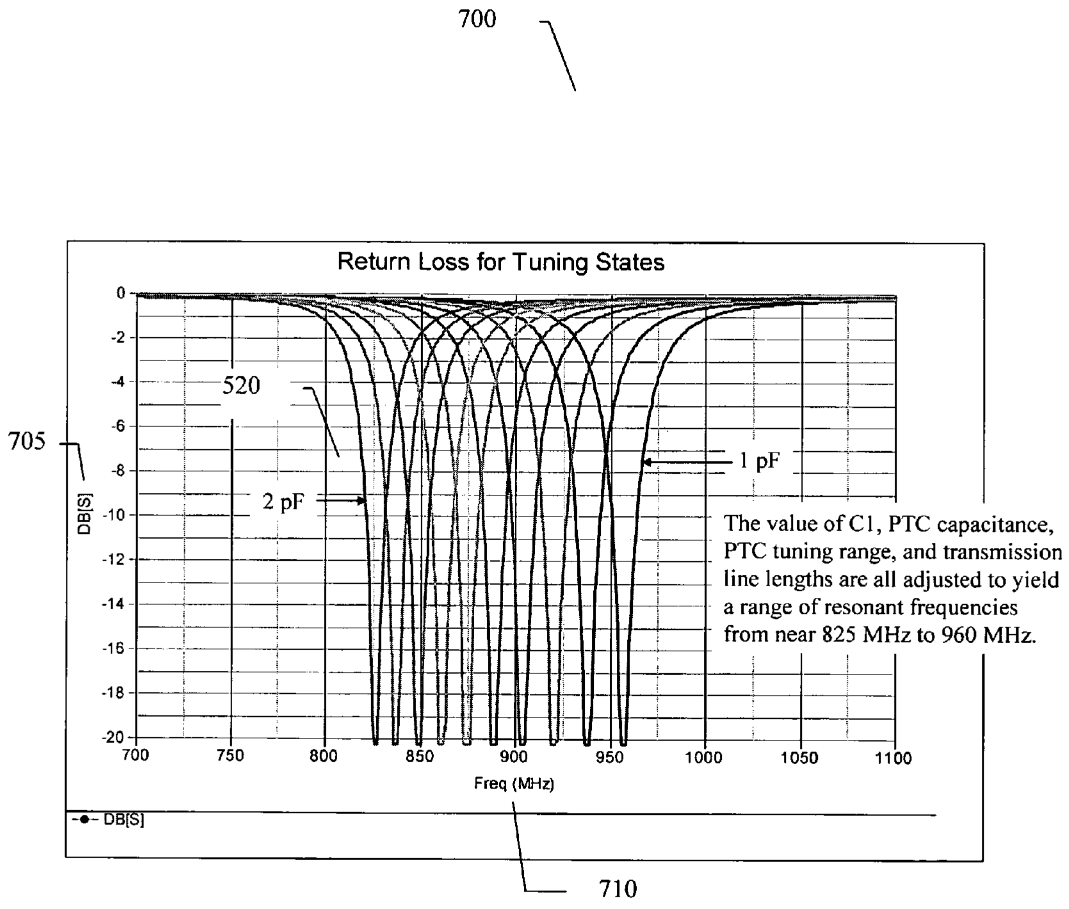
FIG. 7 depicts the input return loss for the equivalent circuit shown in FIG. 5.

The input return loss in db 705 vs. frequency in MHz 710 for this antenna circuit model of FIG. 6 is shown in FIG. 7. The dimensions and capacitance and inductance values may be selected to allow the PIFA to resonate from near 825 MHz to near 960 MHz as the tunable capacitor value varies over an octave ratio from 2 pF down to 1 pF, although the present invention is not limited in this respect.

Figure 8:
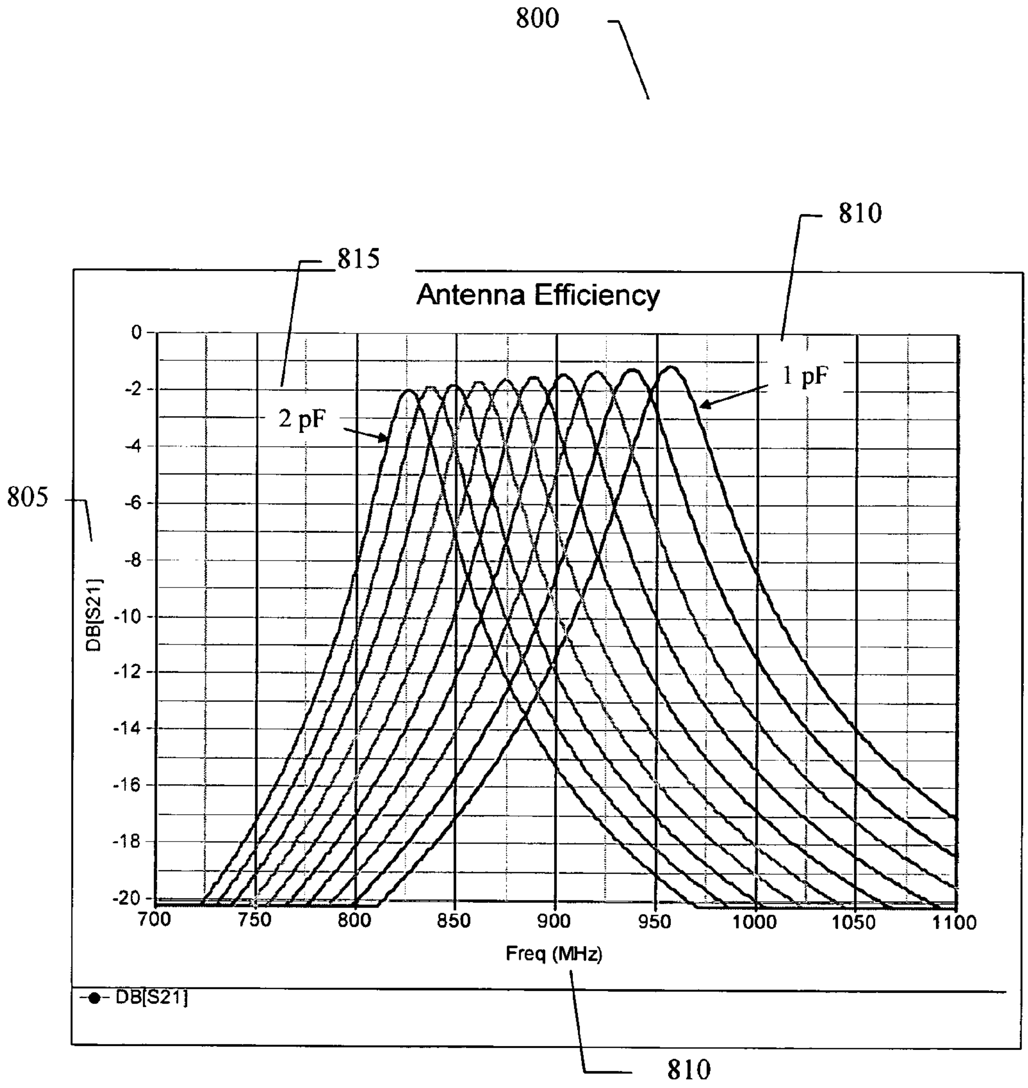
FIG. 8 depicts antenna efficiency for the PIFA equivalent circuit shown in FIG. 5.

Next is shown in FIG. 8 at 800 a plot of the realizable antenna efficiency, which is the ratio of the radiated power (absorbed in resistor R1 that models radiation resistance), to the available power from a 50 ohm Thevenin source that feeds the antenna. This is calculated by replacing the radiation resistance with a port whose impedance varies with frequency to match the radiation resistance. As expected, the antenna efficiency peaks at a frequency very near the corresponding null in return loss as tuning capacitance is swept in 10 equal steps over the range of 1.0 pF 810 to 2.0 pF 815. In this calculation of antenna efficiency, the loss mechanisms in the antenna are the finite Q values of L1, C1, and PTC1 as shown in FIG. 6.

Figure 9:
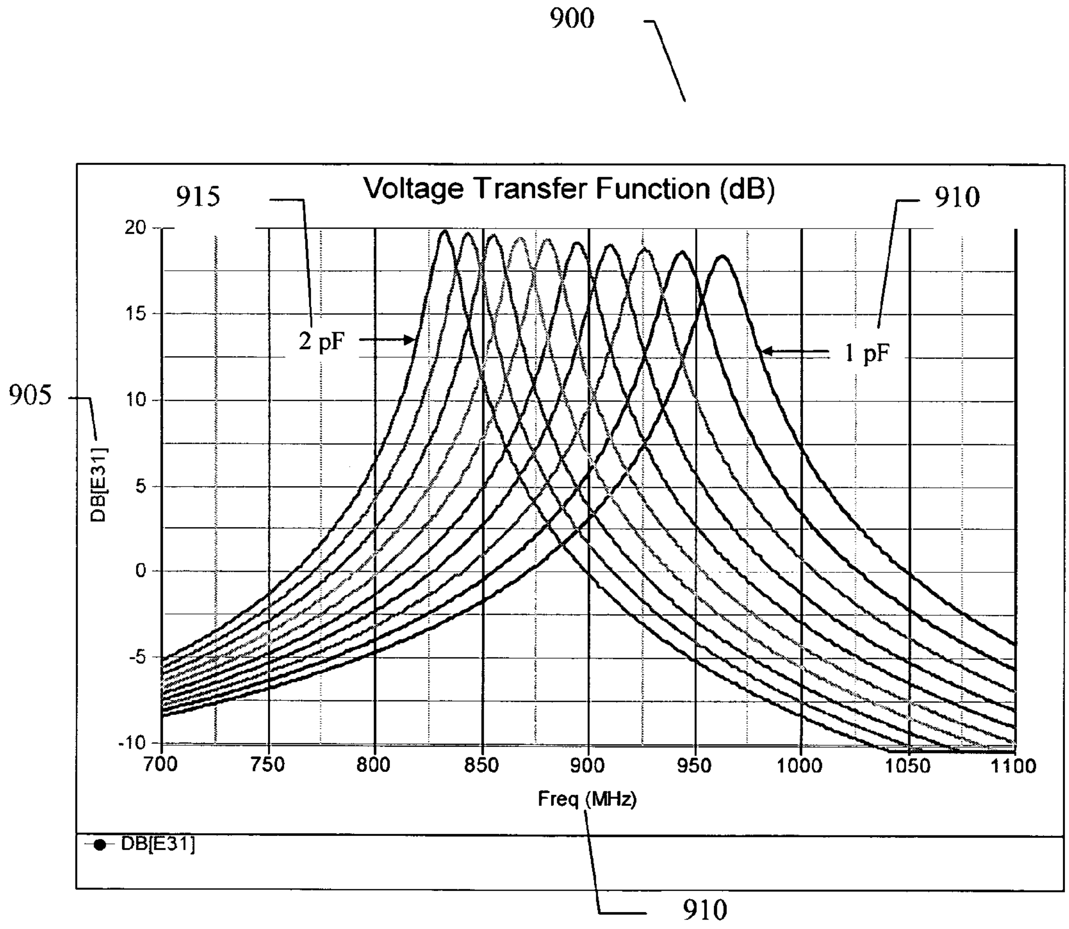
FIG. 9 depicts the magnitude of the voltage transfer function from the antenna input port to the tunable capacitor, PTC1.

A key step in understanding the present invention is to understand the voltage transfer function between the RF voltage across the tunable capacitor, PTC1, and the input voltage at the antenna's input port. This transfer function may be simulated by defining a high-impedance port (for instance 10KΩ) at the circuit node between C1 and PTC1. The results are shown in FIG. 9 in DB 905 vs. Frequency in MHz 910. Here we observe that at resonance, voltage across the tunable capacitor peaks at a value between 18 dB and 20 dB higher than at the antenna's input port. 2 pF is shown at 915 and 1 pF at 910. However, the most important observation is that the peak in voltage transfer function occurs very near the frequency at which the peak in efficiency occurs.

Figure 10:
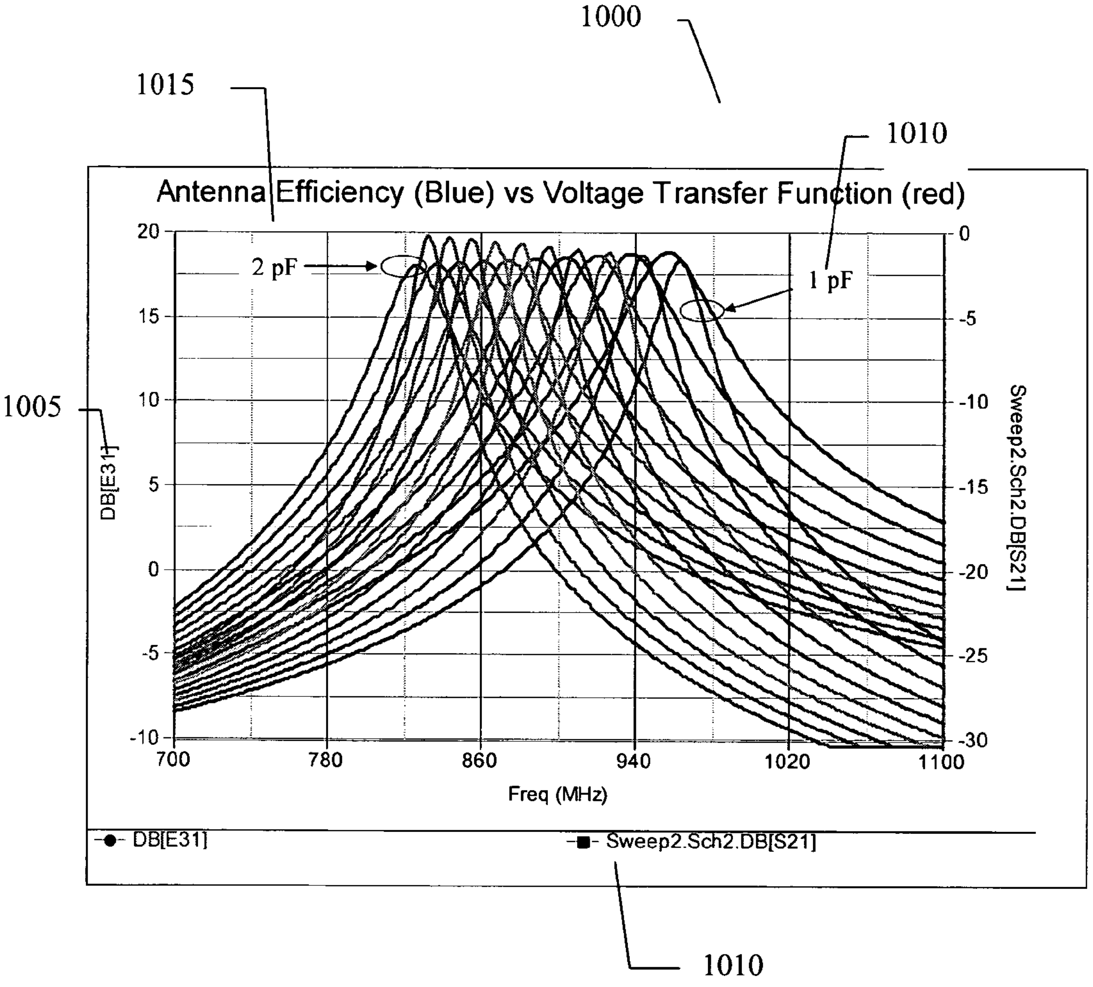
FIG. 10 shows a comparison of antenna efficiency to the voltage transfer function of an embodiment of the present invention.

To better visualize this relationship, the antenna efficiency and voltage transfer function both are plotted on the same graph in FIG. 10 in DB 1005 vs. Frequency 1010. The family of red/brown curves are the voltage transfer function as the tunable capacitor is swept in value from 2 pF 1015 down to 1 pF 1010. The family of blue curves is the antenna efficiency for this same parametric sweep. The important point is that the frequency corresponding to a maximum in antenna efficiency is close to the frequency corresponding to the maximum in voltage across the tunable capacitor. Hence we are led to the observation that maximizing the RF voltage magnitude across the tunable capacitor is sufficient to maximize the antenna efficiency for all practical purposes.

Figure 11:
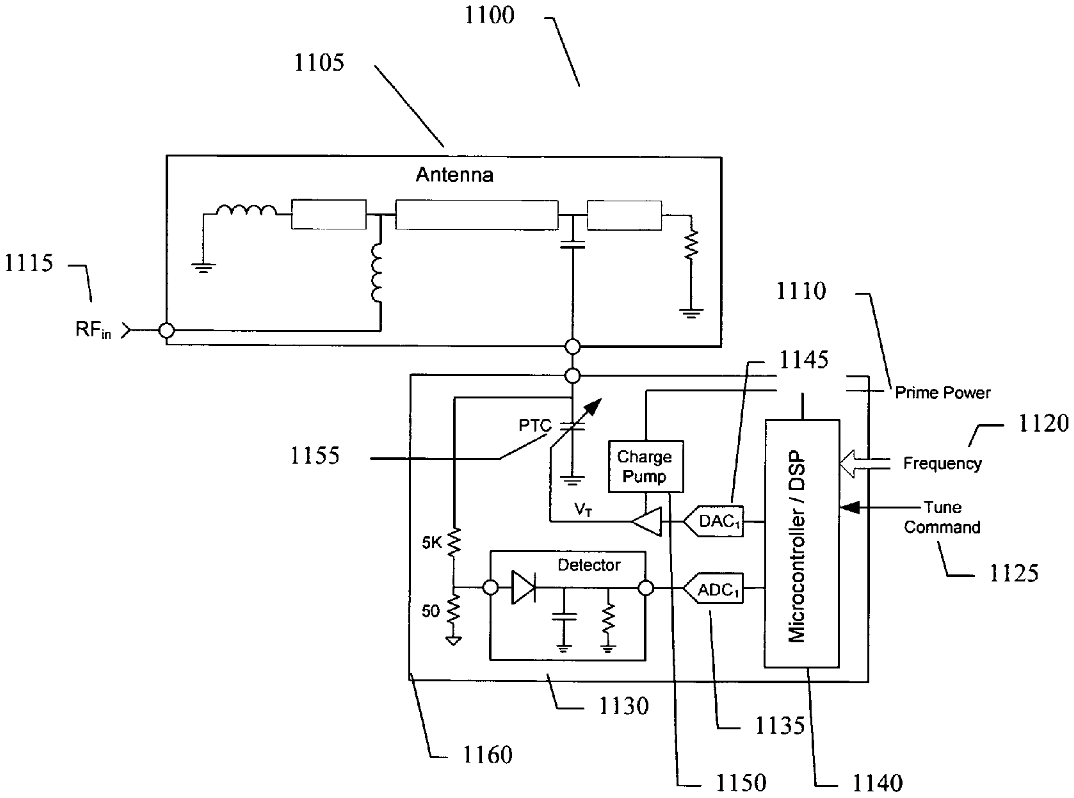
FIG. 11 illustrates an adaptively-tuned antenna system using a shunt reactive tunable element of one embodiment of the present invention.

So in this example, the full invention is shown in FIG. 11, generally as 1100. Here we add a control loop around the variable capacitor to sense the RF voltage magnitude across the capacitor and to adjust the bias voltage that drives this capacitor to maximize that RF voltage. In this embodiment, the PTC 1155 may be a series network of tunable capacitors built onto an integrated circuit. Furthermore the PTC 1155 network may be assembled in a multichip module 1160 that contains a voltage divider, a voltage detector 1130, an ADC 1135, a processor 1140 with input frequency 1120 and tune command 1125, a DAC 1145, a voltage buffer, and a DC-to-DC converter such as a charge pump 1150 to provide the relatively high bias voltage and $RF_{in}$ 1115. A typical bias voltage for the PTC 1155 may range between 3 volts and 30 volts where the prime power may be only 3 volts or less.

As mentioned above, a control algorithm is needed to maximize the RF voltage across the variable capacitor (PTC) in FIG. 11. Sequential measurements of RF voltage may be taken while applying slightly different bias voltages. For instance, assume three PTC bias voltages, V1, V2, and V3 are defined such that V3<V1<V2. Also assume that the net PTC capacitance decreases monotonically with an increase in bias voltage, which is conventional. Thus higher bias voltages tune the antenna to higher resonant frequencies. RF voltage $V_{RFn}$ is measured when the applied bias voltage is $V_n$. The transmit frequency is a CW or narrowband signal centered at $f_o$. An example of a simple tuning algorithm is shown in FIG. 12 at 1210, 1220 and 1230.

Figure 12:
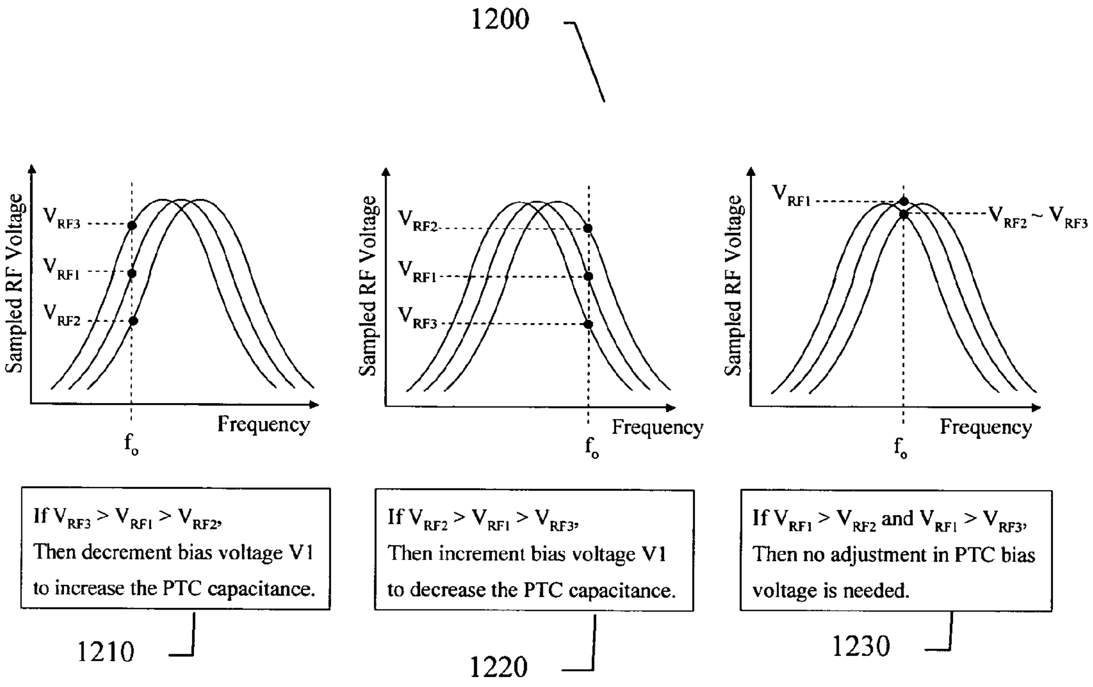
FIG. 12 depicts a simple tuning algorithm capable of being used to maximize the RF voltage across the tunable capacitor in FIG. 11 of one embodiment of the present invention.
Figure 13:
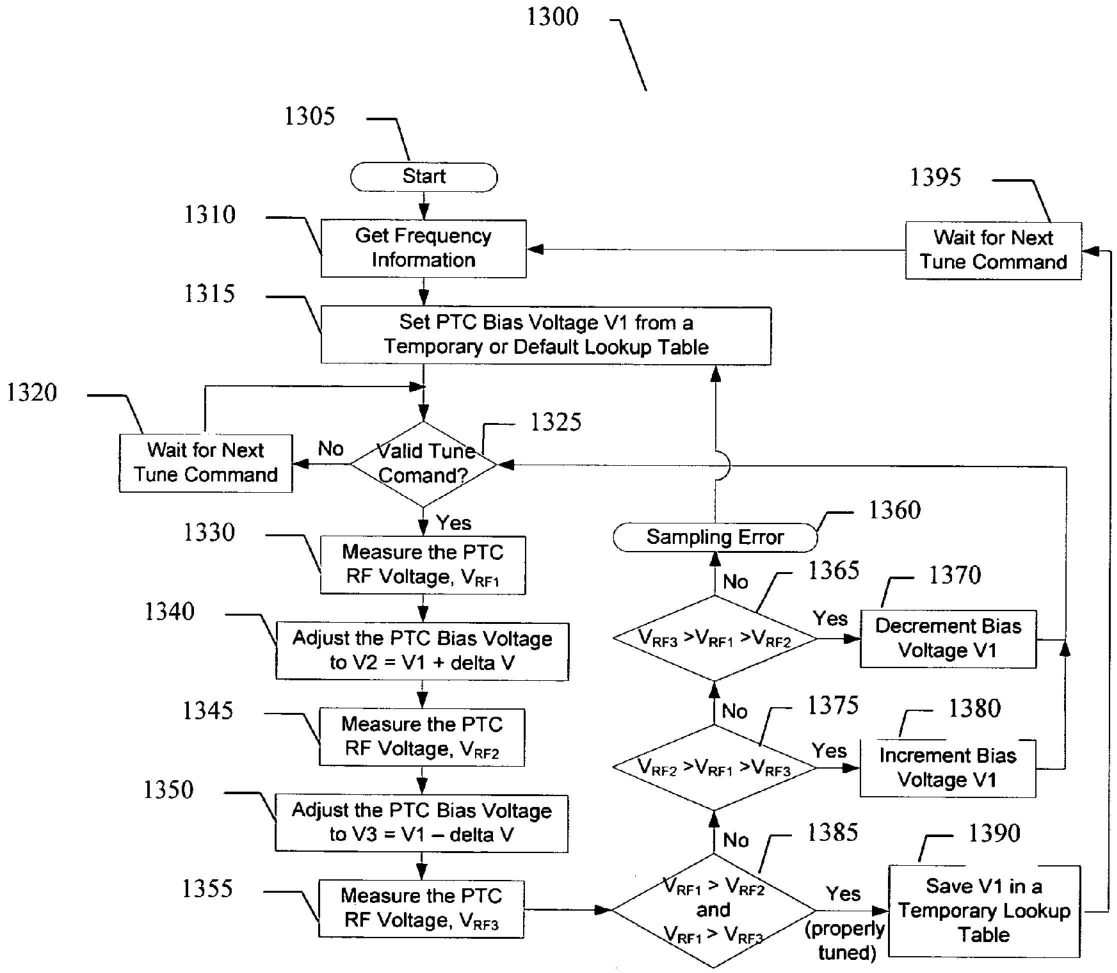
FIG. 13 shows a possible flow chart for the control algorithm shown in FIG. 11 of one embodiment of the present invention.

The control algorithm of FIG. 12 may be described in more detail as a flow chart. One such example, although the present invention is not limited in this respect, is shown in FIG. 13. One of the algorithm features introduced in the flow chart is that frequency information is used to establish an initial guess for the PTC bias voltage. For instance, a default look-up table can be used to map frequency information into nominal bias voltage values. Then the closed loop algorithm may take over and fine tune the bias voltage to maximize the RF voltage present at the PTC.

Furthermore, once the bias voltage is optimized for a given frequency, this voltage may be saved in a temporary look-up table to speed up convergence during the next time that the same frequency is called. For instance, if the antenna is commanded to rapidly switch (in milliseconds) between two distinct frequencies and the physical environment of the antenna is changing very slowly (in seconds) then the temporary look-up table may contain the most useful initial guesses for bias voltage.

The flowchart of FIG. 13 starts at 1305 and gets frequency information at 1310 and sets PTC bias voltage V1 from a temporary or default lookup table 1315. If the tune command is valid at 1325, at 1320 wait for next tune command and return to 1325. If yes at 1325, then at 1330 measure the PTC RF voltage, $V_{rf1}$ and at 1340 adjust the PTC bias voltage to V2=V1+delta V. Then measure the PTC RF voltage, $V_{RF2}$ at 1345, adjust the PTC bias voltage to V3=V1−delta V at 1350 and measure the PTC RF voltage, $V_{RF3}$ at 1355. At 1385 determine if $V_{RF1}>V_{RF2}$ and $V_{RF1}>V_{RF3}$. If yes (and therefore properly tuned) save V1 in a temporary lookup table at 1390 and proceed to step 1395 to wait for the next tune command, after which proceed to step 1310. If no at 1385 determine if $V_{RF2}>V_{RF1}>V_{RF3}$ at 1375 and if yes, at 1380 increment bias voltage V1 and proceed to step 1325. If no at 1375, the proceed to 1365 and determine if $V_{RF2}<V_{RF1}<V_{RF3}$. If yes at 1365 decrement bias voltage V1 at 1370 and proceed to step 1325. If not at 1365 then a sampling error is determined and the flow chart returns to 1315.

Benefits of the aforementioned embodiment may include:
(1) Only one PTC is needed, which reduces cost.
(2) A relatively low cost diode detector may be used assuming the dynamic range is 25 dB or less.
(3) The PTC and all closed loop control components may be integrated into one multichip module with only one RF connection. The need for only one RF connection greatly simplifies the integration effort into an antenna.
(4) Some ESD protection is available from the internal resistive voltage divider.

However, in an embodiment of the present invention three samples of RF voltage may be needed to determine if the antenna is properly tuned and an iterative sampling algorithm may be needed when the PTC voltage needs to be adjusted. Further, the detector may need to be preceded by a voltage buffer to increase its input impedance and a high input impedance may be necessary to achieve good linearity of the antenna (low intermodulation distortion or low levels of radiated harmonics).

Figure 14:
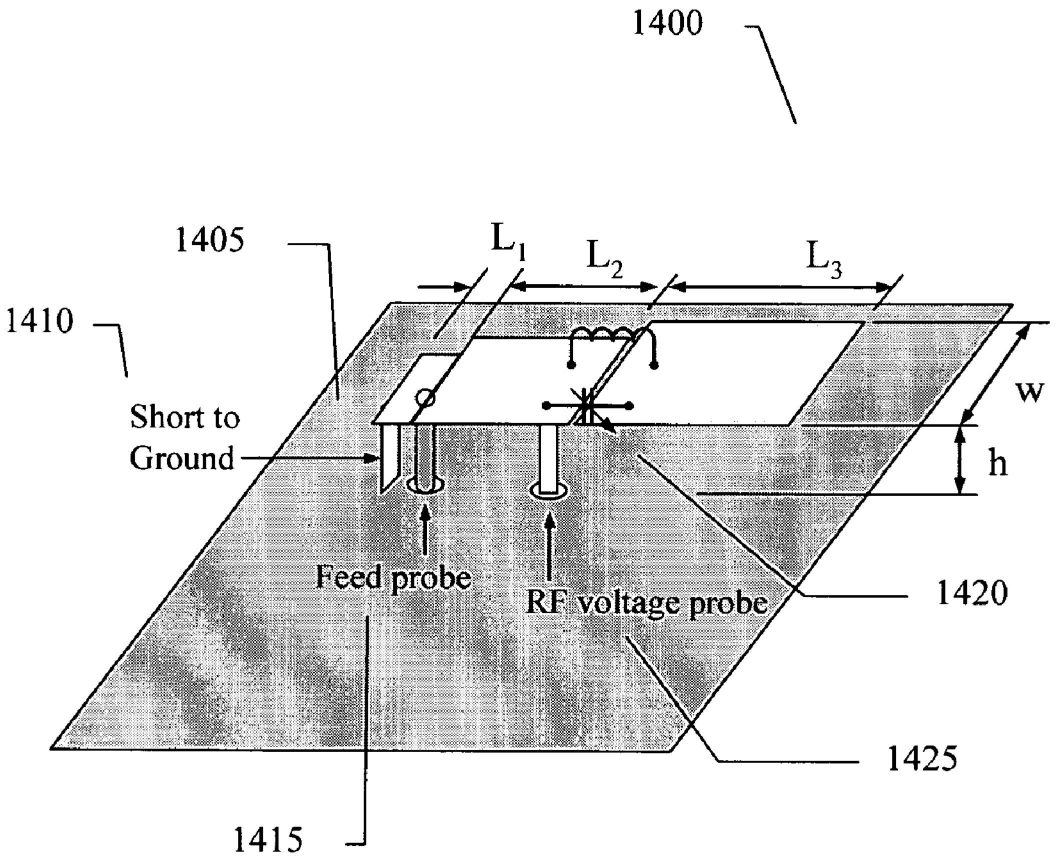
FIG. 14 depicts an example of a tunable PIFA using a series tunable capacitor of one embodiment of the present invention.

As shown in FIG. 14, some embodiments of the present invention provide a planar inverted F antenna (PIFA) 1400 with a series variable capacitor 1420 located between the probe feed 1415 point and the radiating end (open end) of the PIFA. This PIFA is a type of probe-fed patch antenna located above a ground plane and shorted on one end. The dimensions are selected to allow the antenna to resonate as a dual band antenna near 900 MHz and 1800 MHz: L1=1.75 mm, L2=20 mm, L3=34 mm, and h=10 mm, although the present invention is not limited in this respect. In an exemplary embodiment, the width of the PIFA over the three sections of length L1, L2, and L3 may be w=11 mm, 16 mm, and 24 mm respectively. Further, in an embodiment of the present invention, there may be essentially no dielectric substrate between the patch and the ground plane, just an air gap. The antenna may be made variable in resonant frequency by using a variable capacitor that tunes over 1.5 pF to 4 pF. It may be placed in parallel with a lumped 5.1 nH inductor. Together the fixed inductor and variable capacitor form a tunable reactance network. An RF voltage probe (metallic pin) 1425 extends from the ground plane 1405 up to the PIFA lid at a location L2 mm from the feed probe, just next to one terminal of the variable capacitor 1425. The short to ground is illustrated at 1410.

Figure 15:
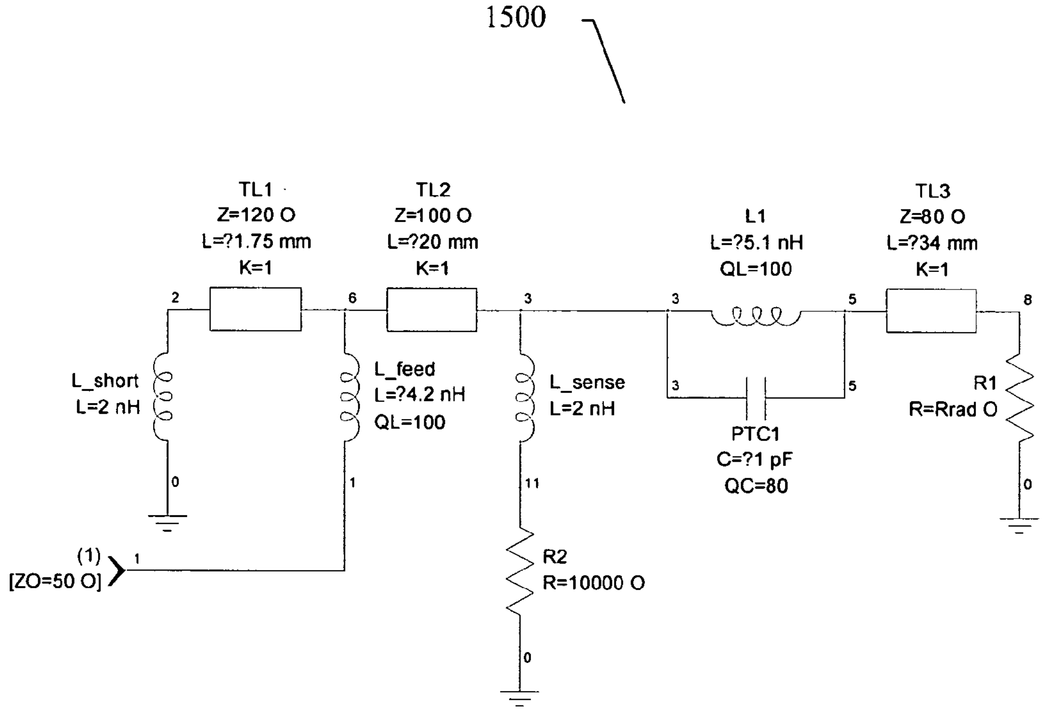
FIG. 15 depicts an equivalent circuit for the tunable PIFA shown in FIG. 14 of one embodiment of the present invention.
Figure 16:
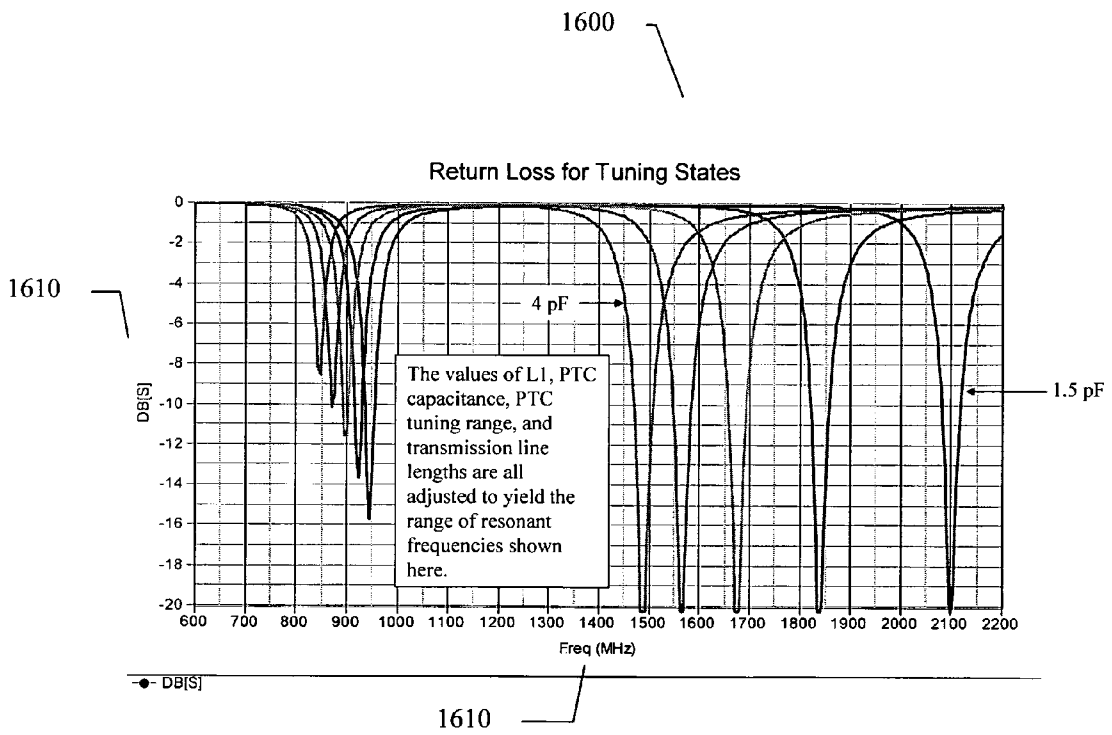
FIG. 16 depicts input return loss for the equivalent circuit model shown in FIG. 15 as the PTC capacitance is varied from 1.5 pF to 4.0 pF in 5 equal steps.

An equivalent circuit for the PIFA of FIG. 14 is shown in FIG. 15 at 1500. It is a transmission line (TL) model where the "lid" of the PIFA is modeled with three TLs of characteristic impedance 120Ω, 100Ω and 80Ω based on the above dimensions. The short is modeled with inductor L1 and designed to have 2 nH of inductance. The feed probe is designed to have a net inductance of 4.2 nH which may be realized in part by a series lumped inductor. The radiation resistance R1 is modeled as 3K Ω at 1 GHz and varies as $1/f^2$ where f is frequency. The input return loss for this antenna circuit model of FIG. 15 is shown graphically in FIG. 16 as DB vs. frequency in MHz. The dimensions and capacitance and inductance values were selected to allow the PIFA to resonate in the 900 MHz cell band and in the 1800/1990 MHz cellphone bands as the tunable capacitor value varies from 4.0 pF down to 1.5 pF. Note that this example is a dual-band PIFA, but the present invention is not limited to this.

Figure 17:
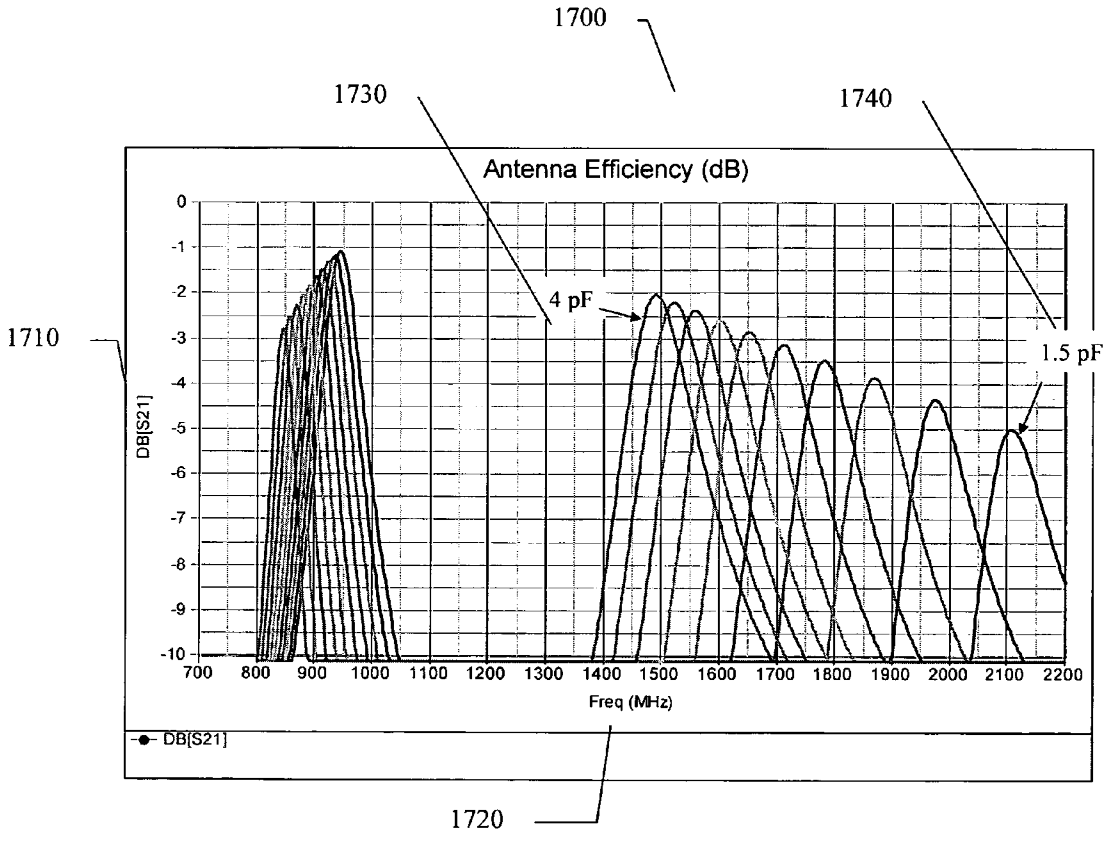
FIG. 17 graphically illustrates antenna efficiency for the PIFA equivalent circuit model shown in FIG. 15.

Turning now to FIG. 17 is a plot, in dB 1710 vs. Frequency in MHz 1720, of the realizable antenna efficiency, which is the ratio of the radiated power (absorbed in resistor R1 that models radiation resistance), to the available power from a 50 ohm Thevenin source that feeds the antenna. The results of FIG. 17 are for the equivalent circuit model of FIG. 15. As expected, the antenna efficiency peaks at a frequency very near the corresponding null in return loss as tuning capacitance is swept over the range of 1.5 pF 1740 to 4.0 pF 1730. In this calculation of antenna efficiency, the loss mechanisms in the antenna are the finite Q values of components L1, L2, L_feed, and PTC1 as shown in FIG. 15. Note also that the input impedance of a 10KΩ voltage detector is included in the equivalent circuit. Only the radiation resistance R1 is responsible for modeling radiated power.

Figure 18:
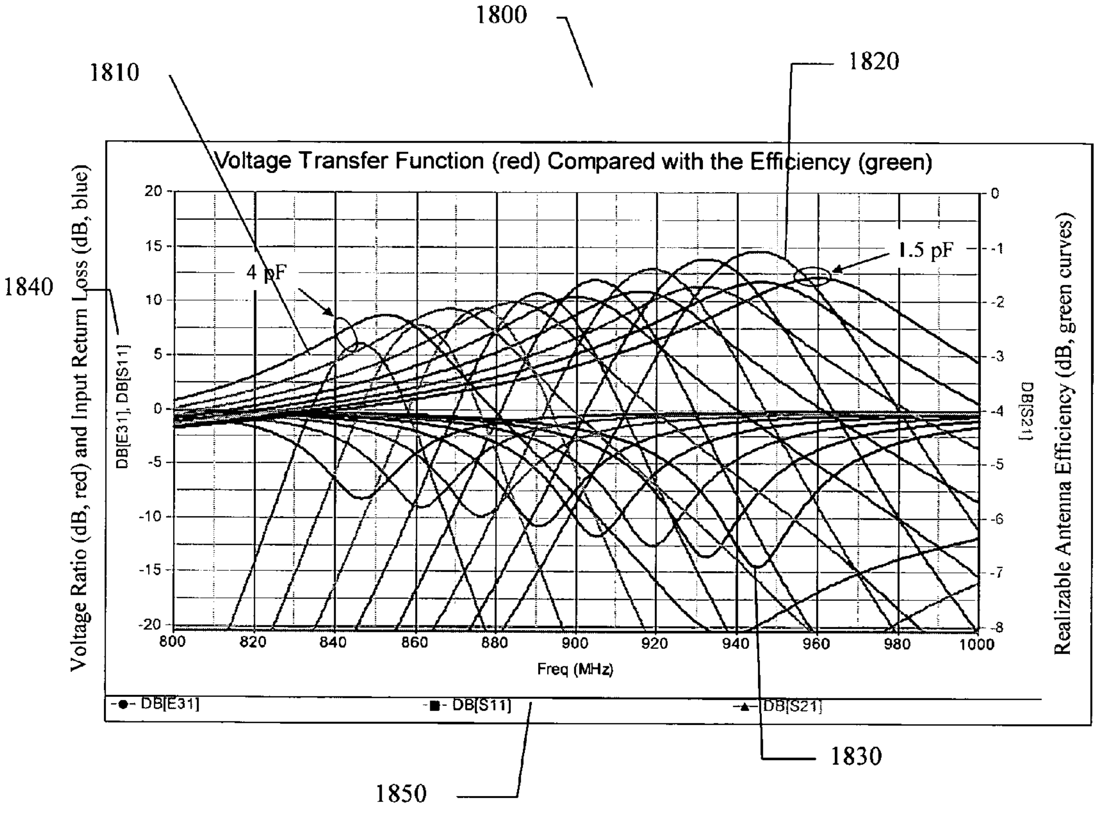
FIG. 18 graphically depicts a comparison of low band antenna efficiency to the voltage transfer function for the equivalent circuit model of FIG. 15.

Now consider the voltage transfer function between RF voltage at the input terminals of the antenna and the RF voltage sensed at node 11 in the schematic of FIG. 15. That voltage ratio is plotted in DB 1840 vs Frequency in MHz 1850 as the family of curves shown starting as 1810 in FIG. 18, as tuning capacitance PTC1 varies from 4.0 pF down to 1.5 pF. As expected, this transfer function peaks at a frequency which is near the peak in antenna efficiency, shown as the family of curves similarly shaded as 1820. Also plotted on this graph is the return loss (similarly shaded family of curves as 1830) for each tuning state. Here we observe that if the tuning capacitance is adjusted to achieve a peak in RF voltage at the sense location (across R2) then the antenna efficiency is within 0.5 dB of its maximum value.

Figure 19:
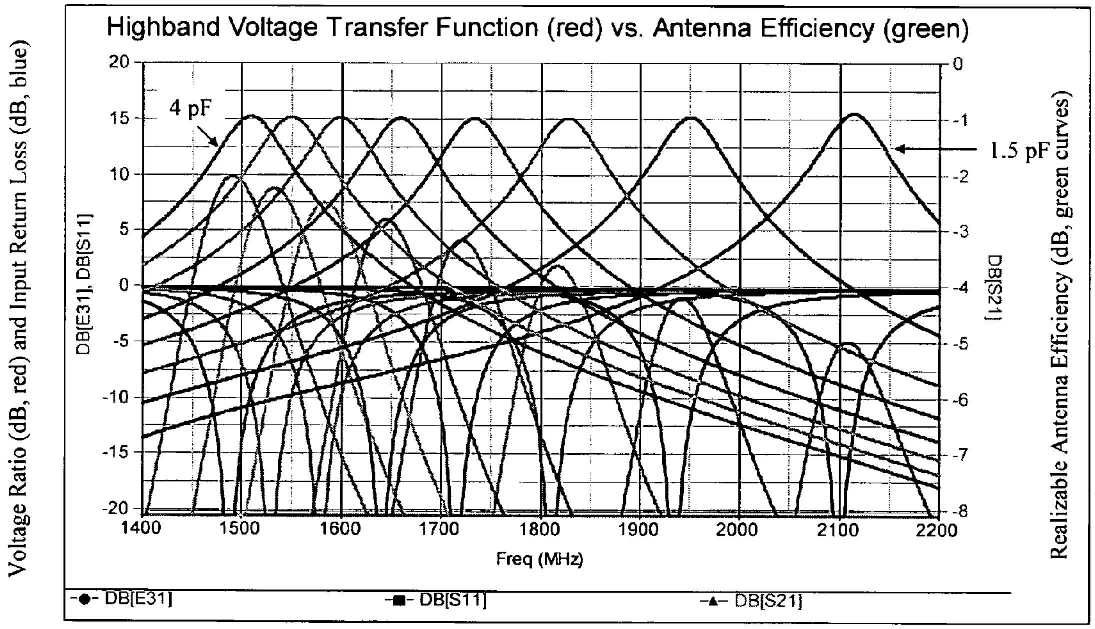
FIG. 19 graphically shows a comparison of high band antenna efficiency to the voltage transfer function for the equivalent circuit model of FIG. 15.

Next consider at FIG. 19 the same voltage transfer function but plotted just for the high band of 1800/1900 MHz. We observe that the frequency for the peak in voltage transfer function is quite close to the frequency for the peak in antenna efficiency. If the PTC capacitance is tuned to maximize the sense voltage for a narrowband input signal, then the efficiency will be within 0.5 dB of its maximum value. So again we have an example which supports the premise that maximizing a sensed voltage on the antenna will, for all practical purposes, allow the antenna efficiency to be maximized.

Figure 20:
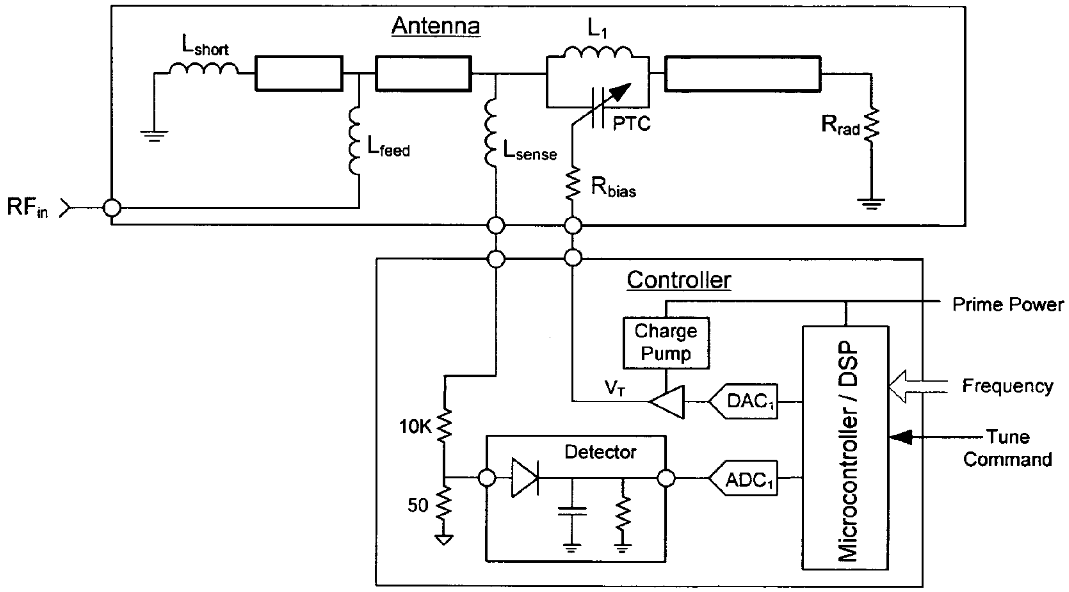
FIG. 20 depicts an adaptively-tuned antenna system using a series reactive tunable element of one embodiment of the present invention.

The full embodiment is shown in FIG. 20. The details are the same as above with the PTC moved up into the antenna, actually on top of the PIFA lid, and the multichip module contains the same control loop components as discussed above. Furthermore the same control algorithms that were presented above may be applied to adaptively tune this PIFA example that has a series PTC.

Figure 21:
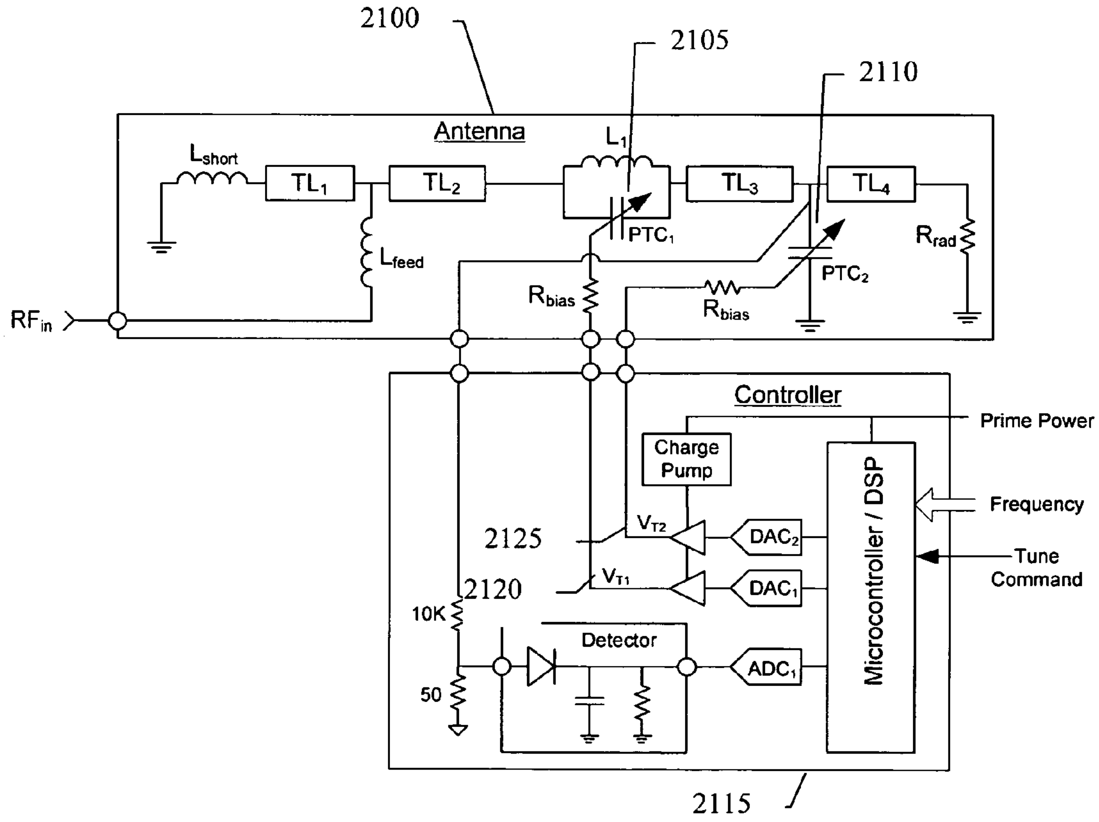
FIG. 21 depicts an adaptively-tuned antenna system using both series and shunt reactive tunable elements of an embodiment of the present invention.

Looking now at the schematic diagram of FIG. 21 is a more sophisticated embodiment of the first embodiment of present invention. In this example, two different PTCs 2105 and 2110 may be used at separate locations within the antenna 2100, and hence at two locations in the equivalent circuit. PTC1 2105 may be a series capacitor while PTC2 2110 may be a shunt cap. RF voltage may be sensed at a number of possible locations along the transmission line that forms this antenna 2100, but shown here is a sense location at PTC2 2110. The controller module 2115 is similar to that provided above, but it may generate two independent tuning voltages, VT1 2120 and VT2 2125, which control independent PTCs. These tuning voltages are adjusted by the controller 2115 to maximize the magnitude of the sensed RF voltage. The control algorithm may use a multi-dimensional maximization routine.

Varying the capacitances of the two PTCs 2105 and 2110 in the closed loop system of FIG. 21 will not only maximize the antenna efficiency, it will tend to minimize the input return loss for a standard 50 ohm system impedance. However, if radio architecture has been designed such that the system impedance is different for transmit and receive signal paths, then the antenna 2100 with embedded reactive elements may be tuned differently between Tx and Rx modes so as to accommodate these two different subsystem impedances. For instance, the Tx subsystem may be designed for a 20 ohm impedance to more easily couple to a power amplifier output stage. The Rx subsystem may be designed for a 100 ohm subsystem impedance to more easily match to the first low noise amplifier stage. A single adaptively-tuned antenna may accommodate both modes through automatic tuning.

Figure 22:
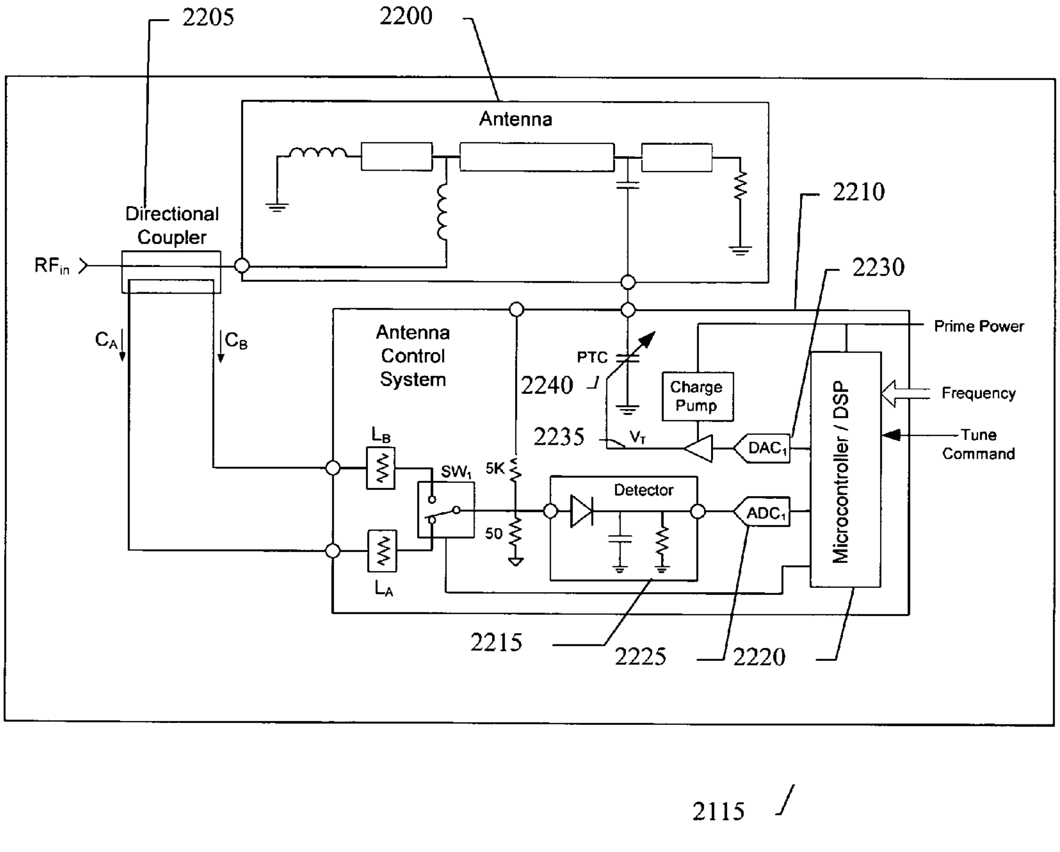
FIG. 22 depicts an example of the second embodiment of an adaptively-tuned antenna system of one embodiment of the present invention.

In a fourth embodiment of the present invention as schematically shown in FIG. 22, the embodiment of FIG. 2 for an adaptively-tuned antenna system is modified. In this embodiment, the same PIFA may also be employed as used in the first embodiment above and shown in FIG. 4. Hence its equivalent circuit and electrical performance are the same as shown above in the first embodiment. However, in this embodiment a directional coupler 2205 is added at the input side of the antenna 2200 to allow the input return loss to be monitored.

The directional coupler 2205 has coupling coefficients $C_A$ and $C_B$, such as −10 dB to −20 dB, although the present invention is not limited in this respect. So a small amount of forward power and small amount of reverse power are sampled by the coupler 2205. Those signals are fed into a multichip module containing the controller 2210 and its associated closed loop components. In this example, the sampled RF signals from the coupler 2205 are attenuated (if necessary) by separate attenuators LA and LB, and then sent through a SPDT RF switch before going to the RF voltage detector. In this example, detector samples the forward and reverse power in a sequential manner as controlled by the microcontroller 2220. However, this is not a restriction as two diode detectors may be used in parallel for a faster measurement. The detected RF voltages may be sampled by ADC1 2225 and used by the microcontroller 2220 as inputs to calculate return loss at the antenna's 2200 input port. The microcontroller 2220 may provide digital signals to DAC1 2230 which are converted to a bias voltage 2235 which determines the capacitance of the PTC 2240. As the reactance of the PTC 2240 changes, the input return loss of the antenna 2200 also changes. The controller 2210 may run an algorithm designed to minimize the input return loss. The finite directivity of the directional coupler 2205 may set the minimum return loss that the closed loop control system 2210 can achieve.

Since the microcontroller 2220 or DSP chip computes only the return loss (no phase information is available), then an iterative tuning algorithm may be required to minimize return loss. In general, the tuning algorithm may be a scalar single-variable minimization routine where the independent variable is the PTC bias voltage and the scalar cost function is the magnitude of the reflection coefficient. Many standard mathematical choices exist for this minimization algorithm including (1) the golden section search and (2) the parabolic interpolation routine. These standard methods and more are described in section 10 of Numerical Recipes in Fortran 77: The Art of Scientific Programming by William H. Press, Brian P. Flannery, Saul A. Teukolsky, and William T. Vetterling.

Figure 23:
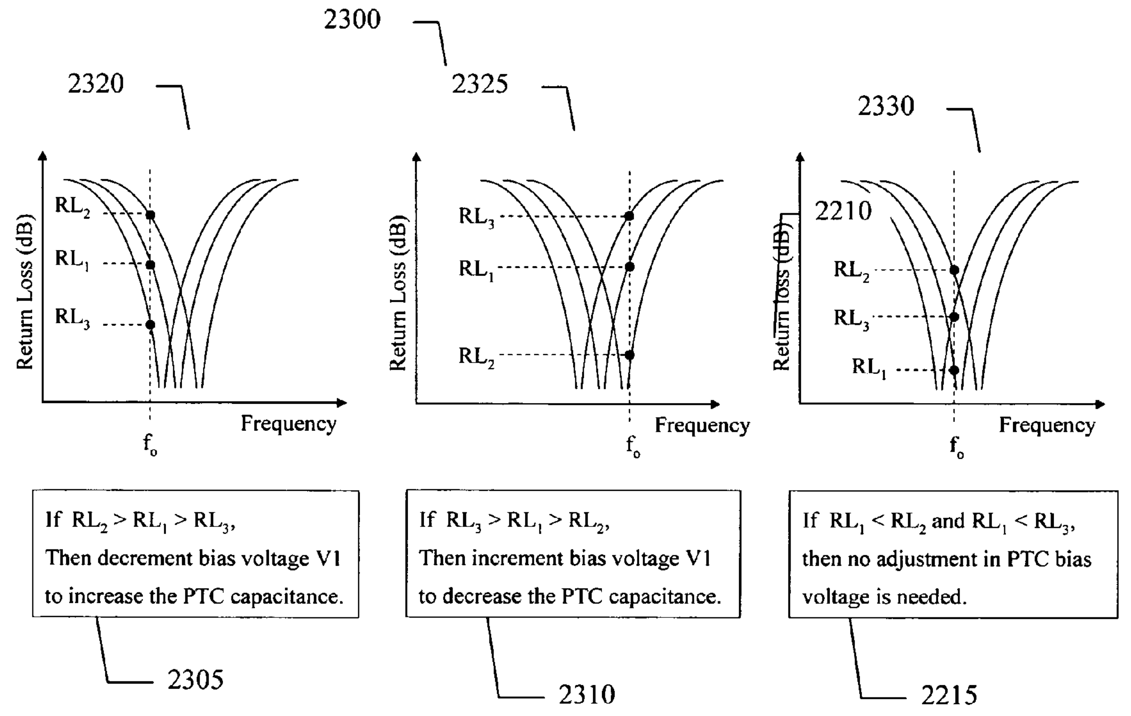
FIG. 23 illustrates a control algorithm for the adaptively-tuned antenna shown in FIG. 22 of one embodiment of the present invention.

Turning now to FIG. 23 at 2300 is a simple control algorithm 2305, 2310 and 2315 for the adaptively-tunable antenna of FIG. 22. Assume three PTC bias voltages, V1, V2, and V3 are defined such that V3<V1<V2. Also assume that the net PTC capacitance decreases monotonically with an increase in bias voltage. Thus higher bias voltages tune the antenna to higher resonant frequencies. Return loss $RL_n$ is measured (in dB) when the bias voltage applied is $V_n$. The transmit frequency is a CW or narrowband signal centered at $f_o$. Although the present invention is not limited in this respect, the algorithm may include at 2305 if $RL_2>RL_1>RL_3$, then decrement bias voltage $V_1$ to increase the PTC capacitance. At 2310 if $RL_3>RL_1>RL_2$, then increment bias voltage $V_1$ to decrease the PTC capacitance. At 2315, if $RL_1<RL_2$ and $RL_1<RL_3$, then no adjustment in PTC bias voltage is needed. The corresponding graph for step 2305 is shown at 2220 and step 2310 at 2325 and step 2315 at 2230.

Figure 24:
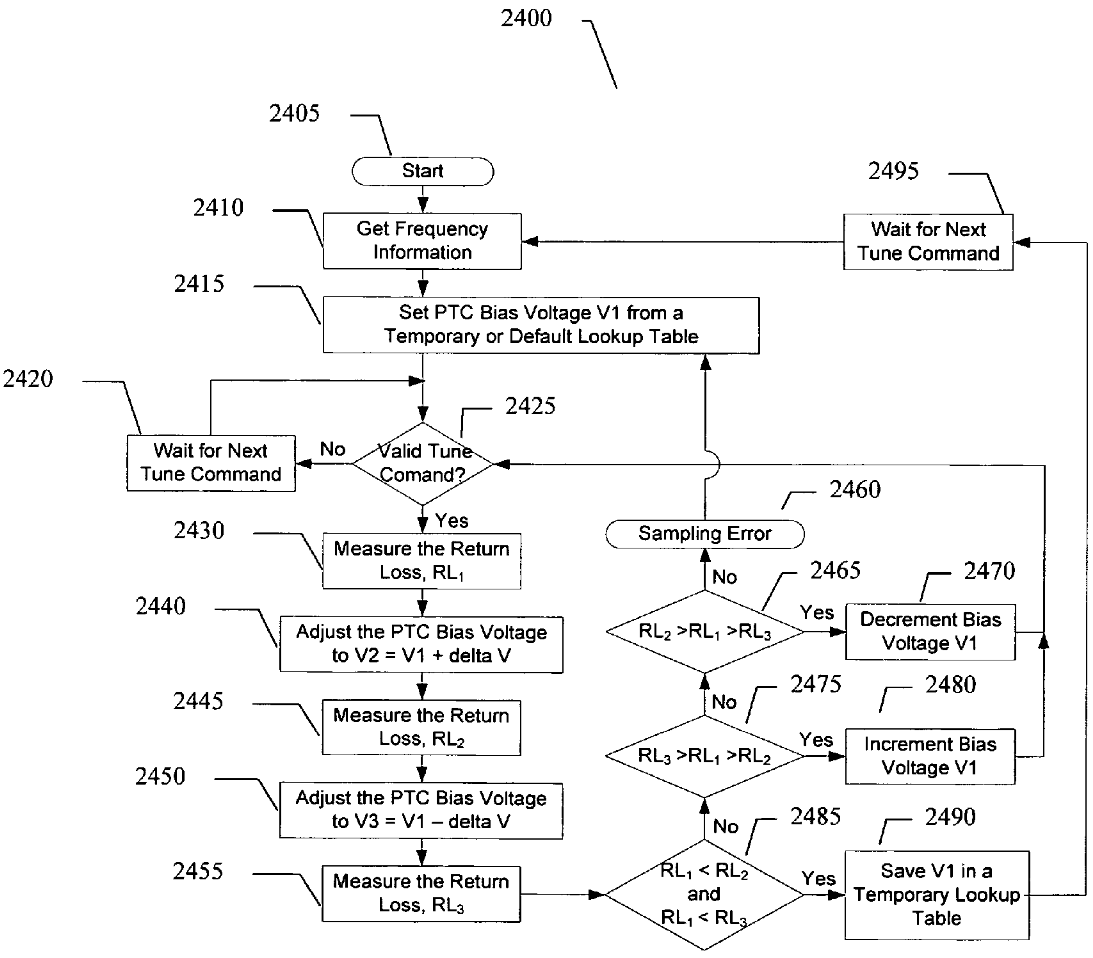
FIG. 24 illustrates one possible flow chart for the control algorithm shown in FIG. 22 of one embodiment of the present invention.

The control algorithm of FIG. 23 may be described in more detail as a flow chart. One such example is shown in FIG. 24. One of the algorithm features introduced in the flow chart is that frequency information may be used to establish an initial guess for the PTC bias voltage. For instance, a default look-up table can be used to map frequency information into nominal bias voltage values. Then the closed loop algorithm may take over and fine tune the bias voltage to minimize the input return loss (in dB) at the antenna's input port.

The flowchart of FIG. 24 starts at 2405 and gets frequency information at 2410 and sets PTC bias voltage V1 from a temporary or default lookup table 2415. If the tune command is not valid at 2425, at 2420 wait for next tune command and return to 2425. If yes at 2425, then at 2430 measure the return loss, RL1 and at 2440 adjust the PTC bias voltage to V2=V1+delta V. Then measure the return loss, RL2 at 2445, adjust the PTC bias voltage to V3=V1=delta V at 2450 and measure the return loss, RL3 at 2455. At 2485 determine if RL1<RL2 and RL1<RL3. If yes save V1 in a temporary lookup table at 2490 and proceed to step 2495 to wait for the next tune command, after which proceed to step 2410. If no at 2485 determine if RL3>RL1>RL2 at 2475 and if yes, at 2480 increment bias voltage V1 and proceed to step 2425. If no at 2475, the proceed to 2465 and determine if RL2>RL1>RL3. If yes at 2465 decrement bias voltage V1 at 2470 and proceed to step 2425. If no at 2465 then a sampling error is determined and the flow chart returns to 2415.

The features and benefits of this present embodiment include:

(1) Only one PTC is needed.

(2) The antenna's return loss is directly measured. Minimization of return loss is a slightly more accurate means of optimizing antenna efficiency compared to maximizing the voltage transfer function for the PTC. Sensing return loss is also a more robust implementation for operation at multiple bands when multiband antennas are tuned.

(3) A relatively low cost detector may be used assuming the dynamic range is 25 dB or less.

(4) The PTC and most closed loop control components may be integrated into one multichip module with only three RF connections: one for the PTC and two for the coupler.

(5) The same multichip module can be used for examples 1 and 2.

The penalties of this example include:

(1) An external coupler is required for sampling of incident and reflected power. This raises the system cost. It also increases the required board area, unless the coupler is integrated into one of the layers of the multichip module. But this would probably increase the module size.

(2) Three samples of return loss involving 6 reads of the ADC are required to determine if the antenna is properly tuned. This approach is expected to be twice as slow as embodiment 1 where the RF voltage across the PTC is sampled.

Some embodiments of the invention may be implemented, for example, using a machine-readable medium or article which may store an instruction or a set of instructions that, if executed by a machine, for example, by a system of the present invention which includes above referenced controllers and DSPs, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

An embodiment of the present invention provides a machine-accessible medium that provides instructions, which when accessed, cause a machine to perform operations comprising improving the efficiency of an antenna system by sensing the RF voltage present on a variable reactance network within the antenna system, controlling the bias signal presented to the variable reactance network, and maximizing the RF voltage present on the variable reactance network. The machine-accessible medium may further comprise the instructions causing the machine to perform operations further comprising controlling an algorithm implemented on a digital processor to maximize the RF voltage is. Further, in an embodiment of the present invention, the machine-accessible medium may further comprise the instructions causing the machine to perform operations further comprising using the digital processor in a baseband processor in a mobile phone.

Some embodiments of the present invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

While the present invention has been described in terms of what are at present believed to be its preferred embodiments, those skilled in the art will recognize that various modifications to the disclose embodiments can be made without departing from the scope of the invention as defined by the following claims.

What is claimed is:

1. A non-transitory machine-accessible medium that provides instructions, which when accessed, cause a machine to perform operations comprising:

increasing an efficiency of an antenna system by sensing a radio frequency (RF) voltage present on a variable reactance network embedded in an antenna of said antenna system;

controlling a bias signal presented to said variable reactance network based on the sensing of the RF voltage; and increasing the RF voltage present on the variable reactance network using an algorithm implemented on a digital processor, wherein the algorithm is an iterative process repeating the sensing of the RF voltage and the controlling of the bias signal based on the sensing of the RF voltage, wherein the digital processor operates in a mobile phone, wherein the digital processor initially obtains a default bias signal from a look-up table stored in a memory of the mobile phone, and wherein the default bias signal is adjusted based on the iterative process.

2. The non-transitory machine accessible medium of claim 1, wherein said variable reactance network comprises at least one of a parallel capacitance or a series capacitance.

3. The non-transitory machine accessible medium of claim 1, wherein the sensing of the RF voltage is at an input port of the antenna, and wherein the sensing is performed during a receive mode of the antenna system.

4. The non-transitory machine accessible medium of claim 1, wherein a multiplicity of variable reactance networks are coupled to said antenna system.

5. The non-transitory machine accessible medium of claim 1, wherein a dual input voltage detector monitor forward and reverse power levels allowing a return loss to be calculated.

6. The non-transitory machine-accessible medium of claim 1, wherein the antenna comprises a patch antenna, a monopole antenna, or a slot antenna, wherein the default bias signal is determined based on frequency information received by the digital processor.

7. The non-transitory machine-accessible medium of claim 1, wherein the variable reactance network comprises at least one of one or more variable capacitors or one or more variable inductors.

8. The non-transitory machine-accessible medium of claim 1, wherein the variable reactance network comprises at least one of one or more semiconductor varactors, one or more micro-electro-mechanical systems (MEMS) varactors, one or more MEMS switched reactive elements, one or more semiconductor switched reactive elements, or one or more ferroelectric capacitors.

9. A method, comprising:

reducing a radiated harmonic distortion of a transmitting antenna system by sensing a radio frequency (RF) voltage present on a variable reactance network within said antenna system;

controlling a bias signal presented to said variable reactance network based on the sensing of the RF voltage; and adjusting the RF voltage present on the variable reactance network using an algorithm implemented on a digital processor, wherein the algorithm is an iterative process repeating the sensing of the RF voltage and the controlling of the bias signal based on the sensing of the RF voltage, wherein the variable reactance network comprises at least one of one or more variable capacitors or one or more variable inductors, wherein the digital processor operates in a mobile phone, wherein the digital processor initially obtains a default bias signal from a look-up table stored in a memory of the mobile phone, and wherein the default bias signal is adjusted based on the iterative process.

10. The method of claim 9 wherein said variable reactance network comprises a parallel capacitance.

11. The method of claim 9 wherein said variable reactance network comprises a series capacitance.

12. The method of claim 9 wherein a multiplicity of variable reactance networks are coupled to the antenna system.

13. The method of claim 9, wherein the variable reactance network comprises at least one of one or more semiconductor varactors, one or more micro-electro-mechanical systems (MEMS) varactors, one or more MEMS switched reactive elements, one or more semiconductor switched reactive elements, or one or more ferroelectric capacitors.

14. The method of claim 9, wherein the variable reactance network is embedded in an antenna of the antenna system.

15. A method, comprising:

reducing a direct current (DC) power consumption of a transceiver system by sensing a radio frequency (RF) voltage present on a variable reactance network within the transceiver's antenna system;

controlling a bias signal presented to said variable reactance network based on the sensing of the RF voltage; and adjusting the RF voltage present on the variable reactance network using an algorithm implemented on a digital processor, wherein the algorithm is an iterative process repeating the sensing of the RF voltage and the controlling of the bias signal based on the sensing of the RF voltage, wherein the variable reactance network comprises at least one of one or more variable capacitors or one or more variable inductors, wherein the digital processor operates in a mobile phone, wherein the digital processor initially obtains a default bias signal from a look-up table stored in a memory of the mobile phone, and wherein the default bias signal is adjusted based on the iterative process.

16. The method of claim 15, wherein the variable reactance network comprises at least one of one or more semiconductor varactors, one or more micro-electro-mechanical systems (MEMS) varactors, one or more MEMS switched reactive elements, one or more semiconductor switched reactive elements, or one or more ferroelectric capacitors.

17. The method of claim 15, wherein the variable reactance network is embedded in an antenna of the antenna system.

* * * * *